Oct. 2, 1934.  E. H. LYSLE  1,975,111
OPTICAL APPARATUS
Original Filed Feb. 16, 1929   9 Sheets-Sheet 2

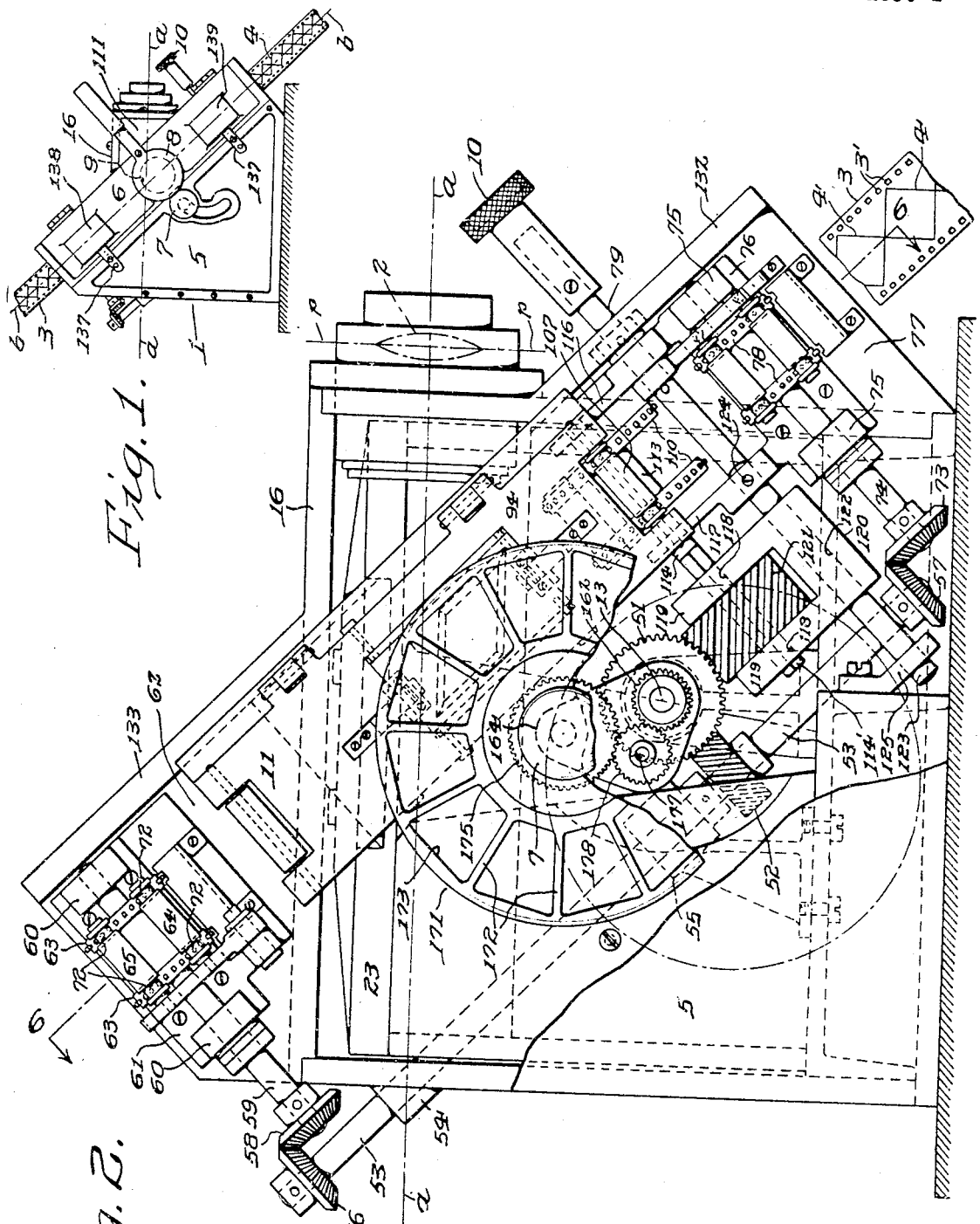

INVENTOR
Edmond H. Lysle.
BY
ATTORNEY

WITNESS

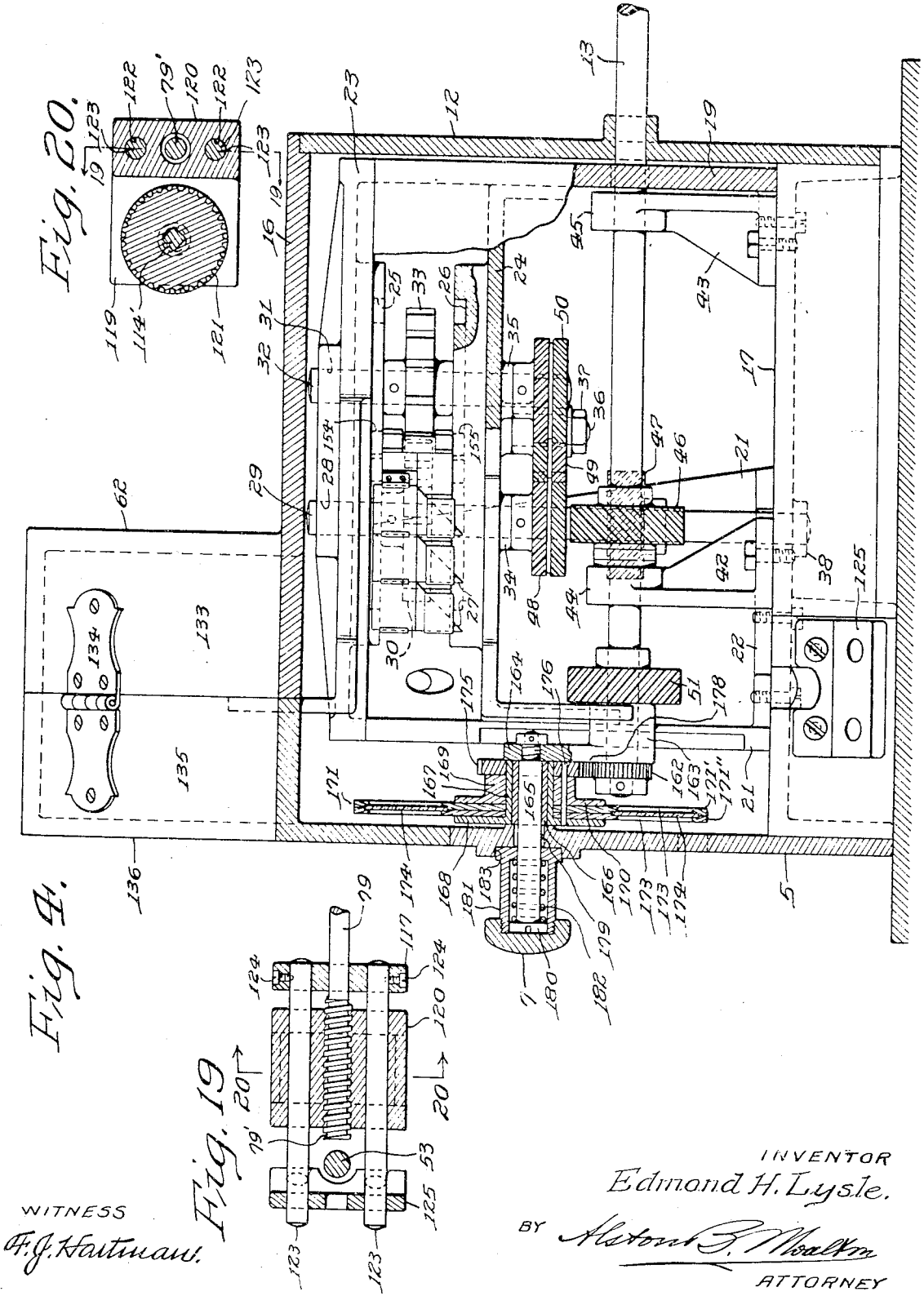

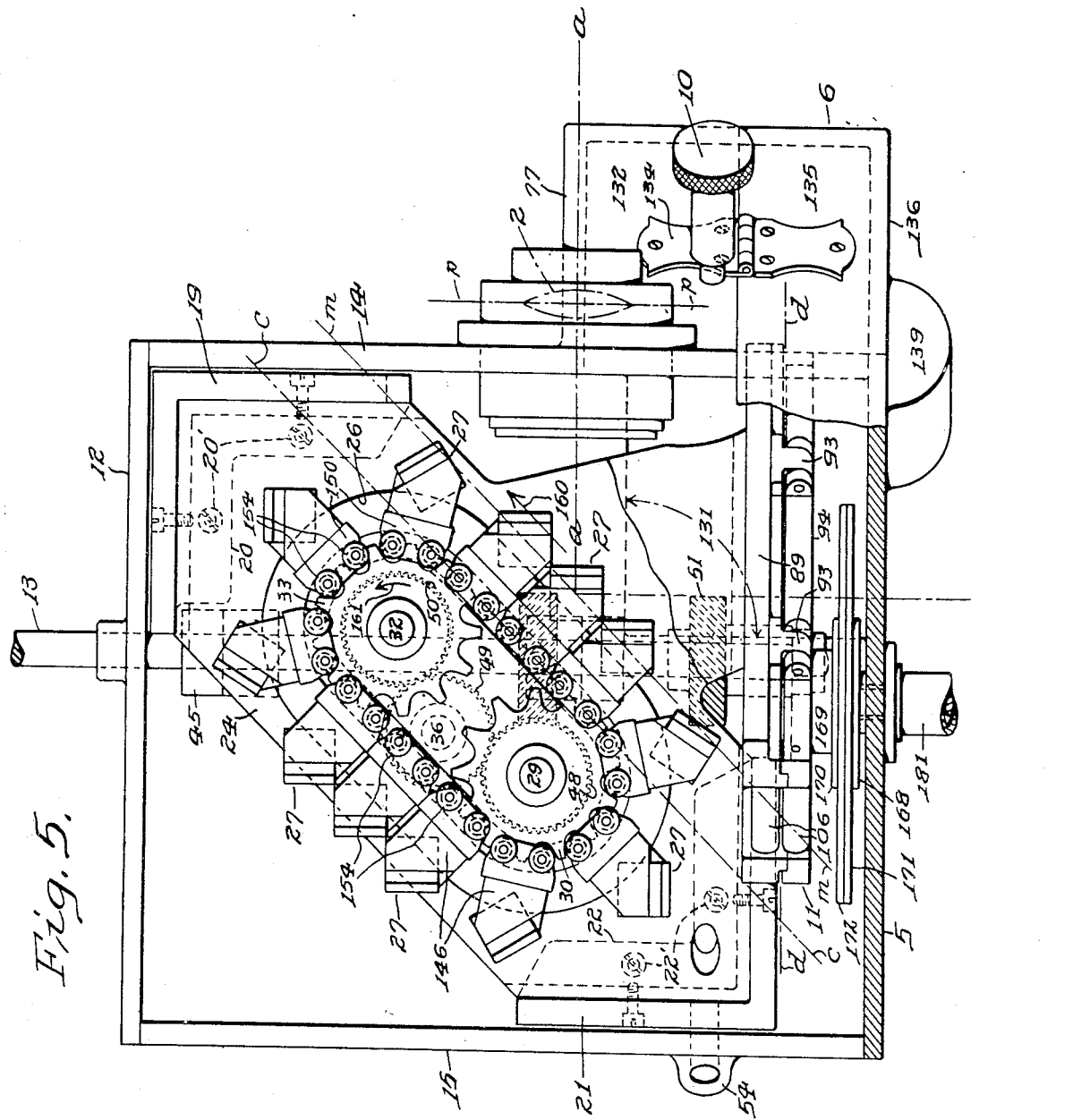

Oct. 2, 1934.　　　　　　　E. H. LYSLE　　　　　1,975,111
OPTICAL APPARATUS
Original Filed Feb. 16, 1929　　9 Sheets-Sheet 5
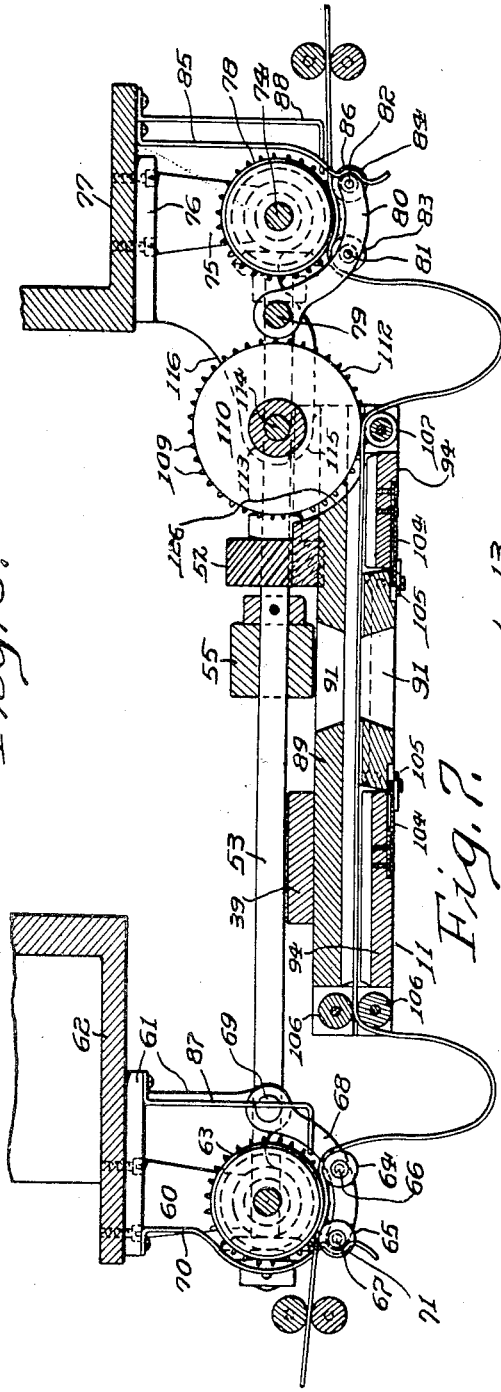
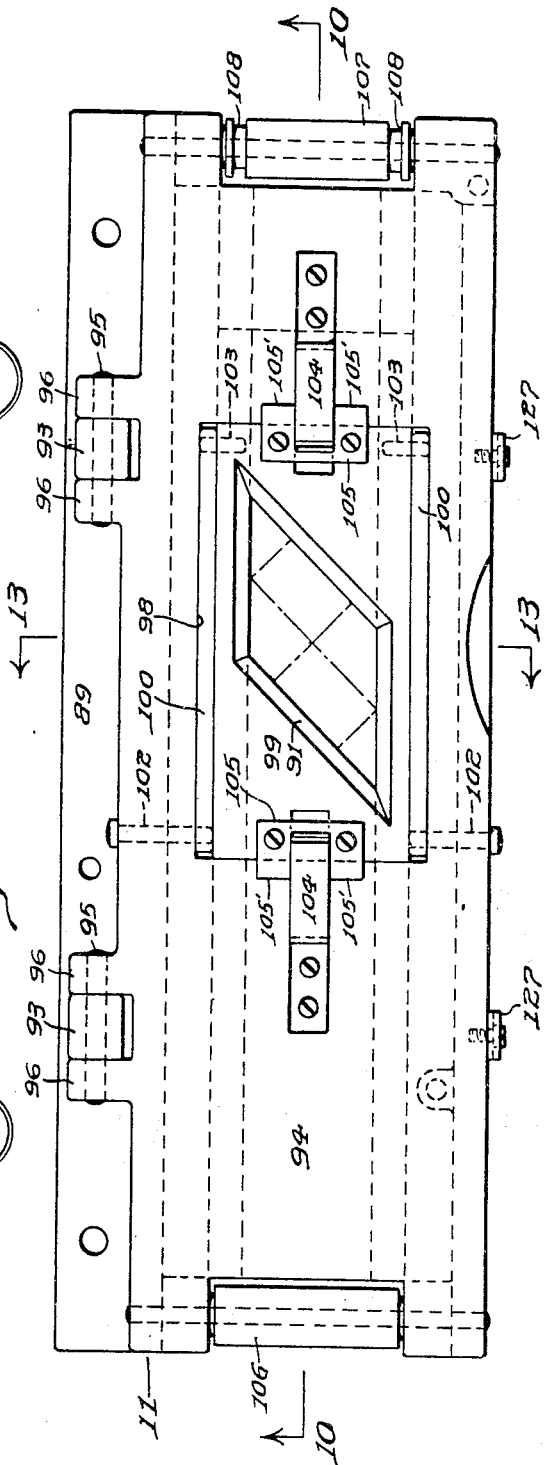
INVENTOR
Edmond H. Lysle,
BY Alston B. Moulton
ATTORNEY
WITNESS
F. J. Hartman.

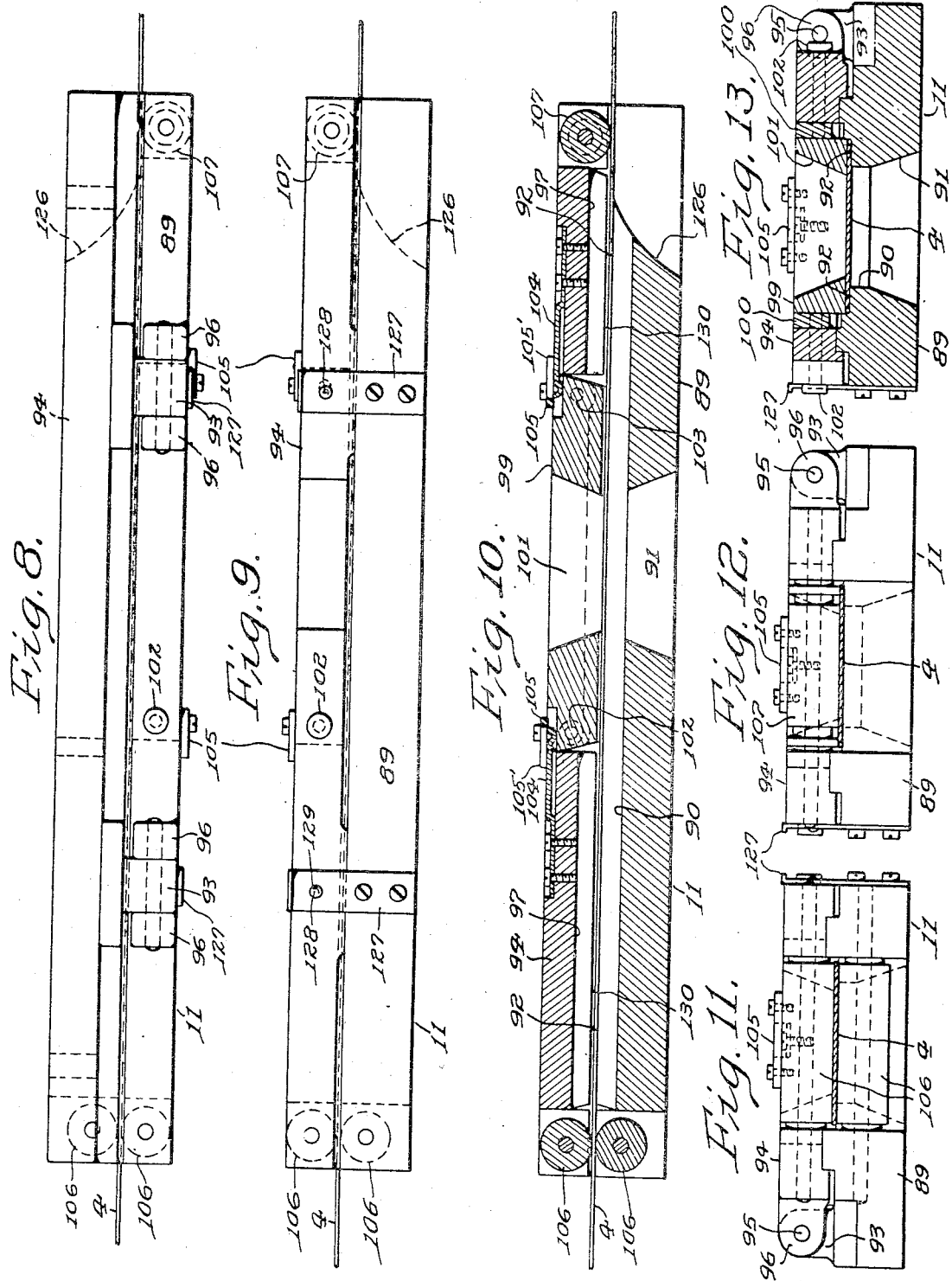

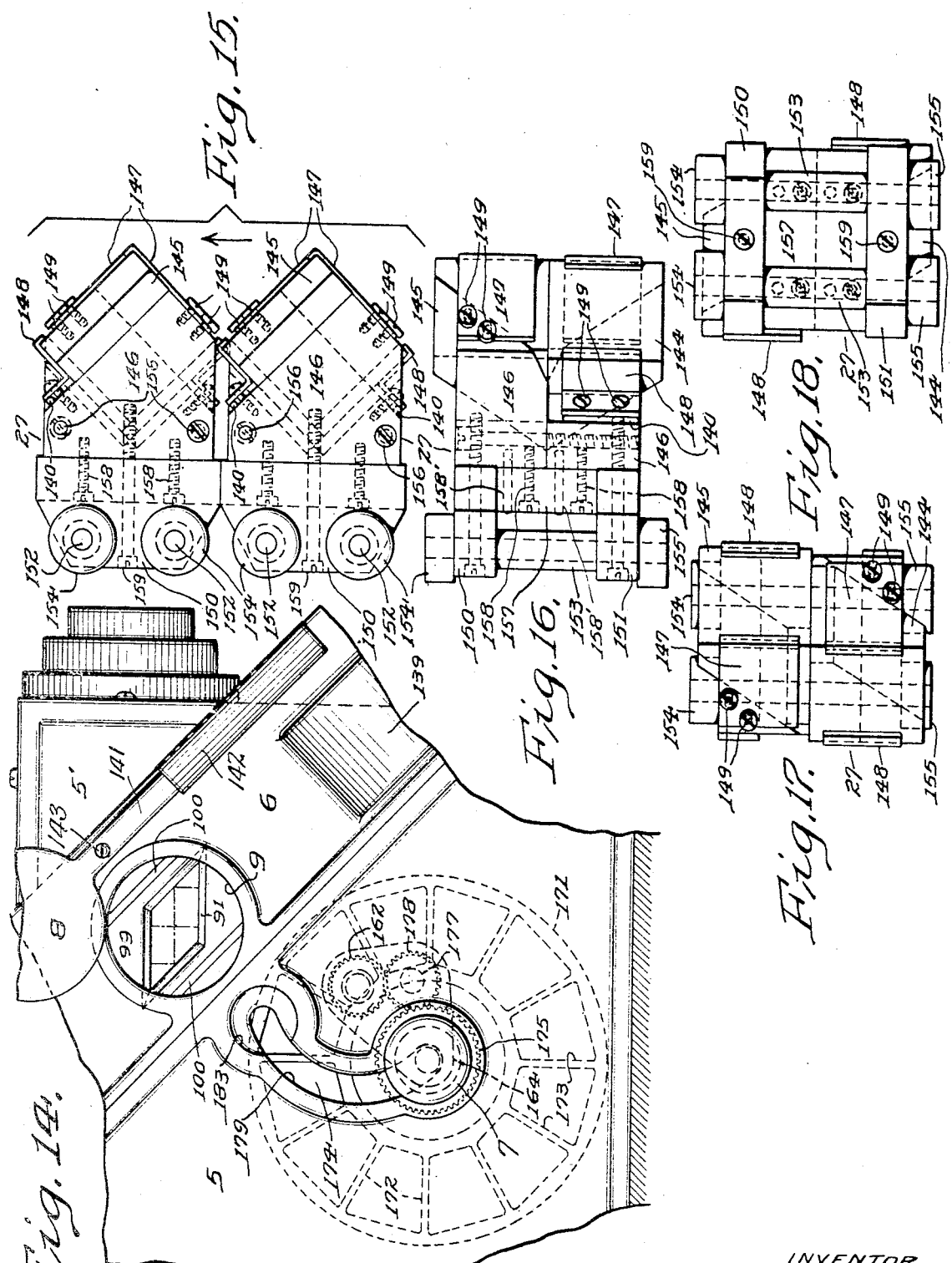

Oct. 2, 1934.      E. H. LYSLE      1,975,111
OPTICAL APPARATUS
Original Filed Feb. 16, 1929     9 Sheets-Sheet 8
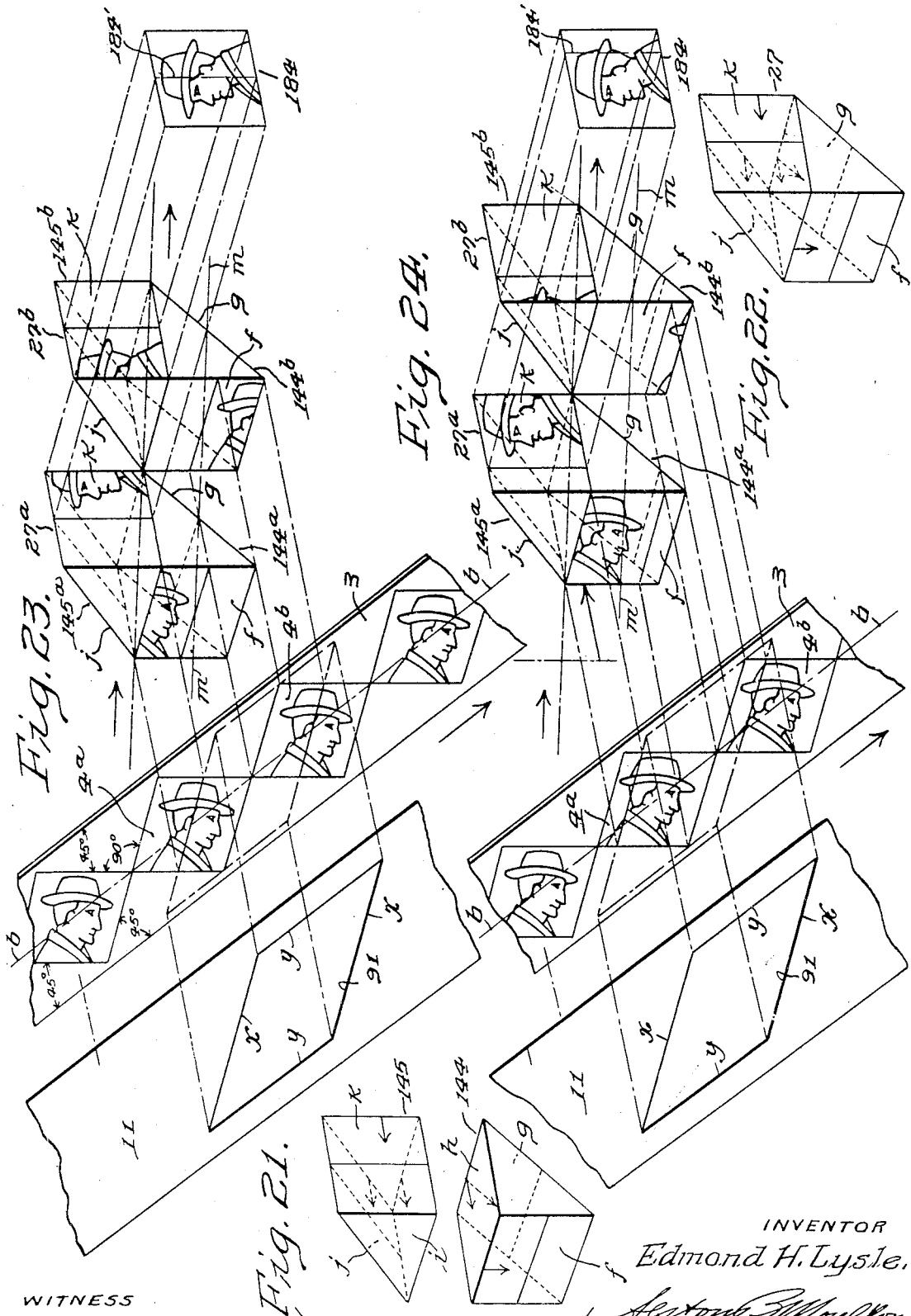
INVENTOR
Edmond H. Lysle.
ATTORNEY
WITNESS

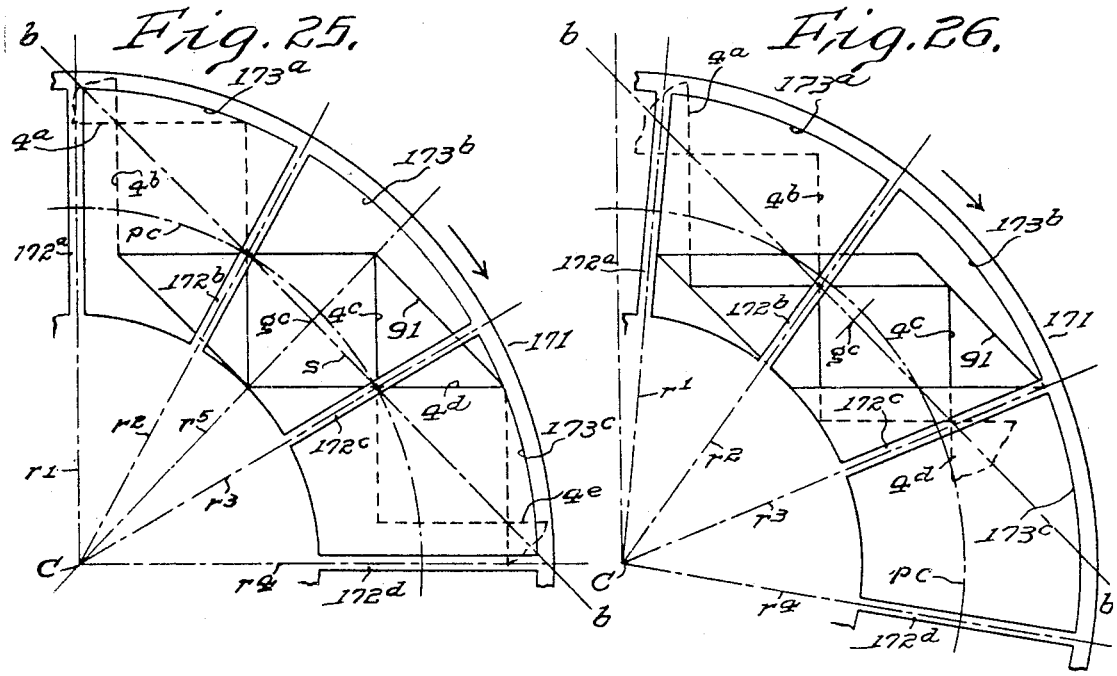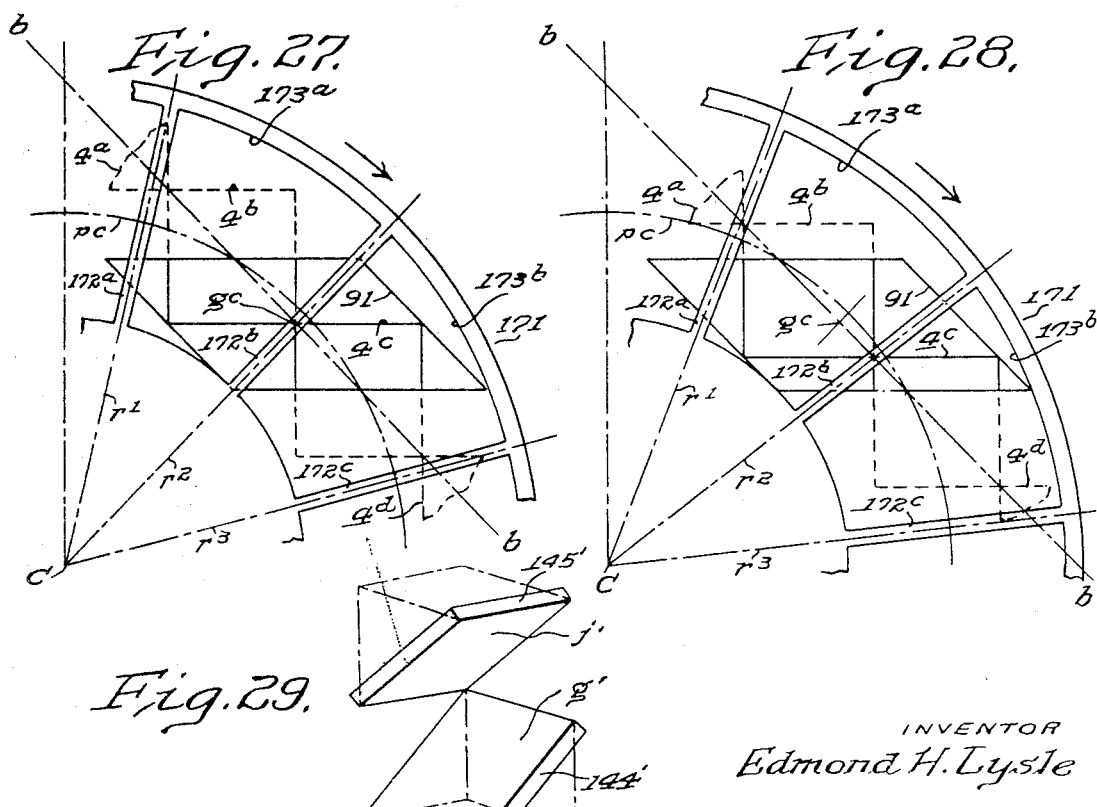

Patented Oct. 2, 1934

1,975,111

UNITED STATES PATENT OFFICE 1,975,111

OPTICAL APPARATUS

Edmond H. Lysle, Ventnor, N. J.

Application February 16, 1929, Serial No. 340,541
Renewed December 16, 1933

18 Claims. (Cl. 88—16.8)

My invention relates to such optical apparatuses as are used to make a continuous series of photographic exposures on a sensitized film of an object which may be in motion, or as are used to project such a continuous series of pictures on a film to a screen, in both instances through a continuously open lens, to or from a continuously moving film, and by means of a continuously moving series of reflectors, the type of apparatus operating on these principles being illustrated in certain Letters Patent of the United States, granted to me, Numbers 1,367,488 dated February 1, 1921 and 1,616,054 dated February 1, 1927; and the object of the present invention is to provide new and improved features of construction whereby the device, as a whole, is considerably simplified; exact operation is more easily attained; and the operation of the device made more certain and exact.

A further object of my invention is to provide a mechanism of the type above referred to wherein the chain or links by which the reflector units have heretofore been pivotally connected together, may be entirely dispensed with and the reflector units may be maintained in contact, each with two others throughout the straight portions of an endless path, and particularly throughout that portion of the path wherein the reflector units traverse the field of illumination of the lens, the reflecting surfaces of said reflector units are maintained in an equally spaced relationship during that straight portion of the path through the field of the lens.

A further object of my invention is to provide readily adjustable means for timing, setting and throwing into and out of operation a rotary color shutter.

A further object of my invention is to impel a series of reflector units, each having two reflecting surfaces in fixed relation to each other, through the field of illumination of a lens of a projector or of a camera at a speed having a definite fixed unvarying optical relationship with respect to the speed of a continuously moving film disposed in a plane normal to the reflected axis of the lens (in a camera) and normal to the direction of the light admitted to the casing (in a projector), said units being not necessarily mechanically pivotally linked together.

A further object of my invention is to cause the reflector units to travel in an endless course around and between two sprocket wheels, through a continuous curvilinear path around said sprocket wheels and in right lines between said sprocket wheels, said curvilinear paths having a constantly increasing radius through 90° of its course around a sprocket wheel and a constantly decreasing radius through the other 90° of its course around said sprocket starting from and ending in the pitch diameter of said sprocket wheel to cause each unit to move slightly radially away from said sprockets in leaving the straight parts of its path and to clear the unit next behind it in changing its direction from a right line travel to a curvilinear travel around the sprocket wheels, and to move back to the pitch line and into contact with the reflector unit next in advance with the unit departing from the said curvilinear travel around the sprocket wheels back to a right line travel.

A further object of my invention is to provide a projector with a rotary color shutter having a series of transparent colored segments forming color screens arranged in a substantially circular series and driven in synchronism with respect to the film so as to hold the color screen proper for a particular exposure, between the source of projector light and the film to pre-color the light passing to and through said picture on the film and to hold said screen in substantial registration with said picture throughout its passage through the reflected field of illumination of the lens, said color screen moving circularly in a plane parallel to the plane of the film and said film moving downwardly and toward the plane of the film in a right line and making an angle of 45° to the horizontal, whereby the light projected to the pictures on the film is successively precolored by the color screens, each color screen being of a color complemental to that of the color screen through which the exposures for the pictures were originally made.

A further object of my invention is to provide a rotary color shutter for projecting pictures to a screen in natural colors in which the color coming from a color screen is maintained on a single exposure or picture (original taken through a screen of complemental color value) during its entire passage through the reflected field of illumination of the lens and the successive colors of the color screen are projected on the screen coincident with the projection of successive pictures on the film to the screen to which the pictures are projected, said colors moving or sweeping across the screen on which the pictures are projected as a series of waves of color or bands of color sweeping across the screen to which the pictures are projected.

A further object of my invention is to make a projector or camera which is compact, light, rigid and smooth in operation in which no shutters or reciprocating parts are embodied and in which the interior film gate or trap is readily accessible.

A further object of my invention is to provide a simple mechanism for framing a picture on the film with respect to the reflectors and to the opening through the film gate whereby a portion of the film within the film gate may be moved from without the casing, longitudinally with respect to the gate and with respect to the adjacent portions of the film and independently of the automatic film feeding and drawing mechanisms.

A further object of my invention is to provide a projector with a series of colored screens arranged in a predetermined sequence and synchronized with respect to the film, to precolor the light projected to each exposure with light, of a color corresponding to that through which that particular part of the film was exposed in making the picture.

A further object of my invention is to propel a series of like unconnected reflector units in a straight path through the field of illumination of a lens, the units being detached units, but arranged in a train, the rearmost unit of the train passing through said field being in engagement with and driven by a wheel, and the unit in advance of said driven unit being in engagement with the unit next ahead, and the unit next behind it in the train.

Further objects of my invention will appear in the specification and claims below.

Referring to the drawings forming a part of this specification and in which the same reference characters are employed throughout the various views to designate the same part, Fig. 1 is a side elevational view, on a small scale, of the device embodying my invention.

Fig. 2 is a similar side elevational view of the same apparatus on a larger scale, with the left wall of the casing broken away, and the film-trap cover removed to expose the film-trap or gate, the mechanism for driving the film through the film gate, the rotating filter or color screens and the mechanism whereby the same are caused to successively pass over the light projection aperture in the film box, and the mechanism for framing the film to the aperture in the film trap.

Fig. 3 is a somewhat similar view of the device, with the film-trap removed, with the front, back, top and bottom walls of the outer casing in vertical cross-section in a vertical plane parallel to the axis through the lens to show the supports on the frame for the film-trap, the upper and lower cam plates in which are the paths or guideways for the series of reflector units, the brackets therefor, a part of one of the brackets being broken away to show the gearing for driving the series of reflector units during the operation of the device.

Fig. 4 is a vertical sectional view through the axis of the filter or color screen and through the outer casing, the parts within the casing being shown in front elevation, to make clear the manner of driving the sprocket wheels by which the reflector units (three are shown) are caused to travel through their endless path in the cam plates, the other reflector units being omitted to show the sprockets behind them. In this view, the film-trap, which is disposed at an angle of 45 degrees to the vertical, and all of the gearing therefor, except the driving gear in the main shaft, are omitted to avoid confusion in the drawings.

Fig. 5 is a plan view of the mechanism with the top of the casing and the upper cam plate of the reflector unit support, removed, giving a plan view of a complete series of reflector units operatively mounted to move in an endless course driven by the driving sprocket wheels, the film-trap (with the mechanism for drawing the film through the trap omitted) being shown in its relative position between the color screen and the series of reflectors.

Fig. 6 is a longitudinal sectional view of the film-trap on the line 6—6 of Fig. 2, through the film-trap and the mechanism for moving the film through the casing.

Fig. 7 is a front view of the film-trap on a larger scale than that shown in Fig. 6.

Figs. 8 and 9 are respectively top and bottom edge views of the film-trap on the same scale as Fig. 7 and Fig. 10 is a longitudinal sectional view on the line 10—10 of Fig. 7.

Fig. 11 is an elevational view of the upper end of the film-trap; Fig. 12 of the lower end view of the film-trap, and Fig. 13 is a transverse sectional view on the line 13—13 of Fig. 7.

Fig. 14 is a fragmentary side elevational view showing the color screen in inoperative position and out of registration with the opening for the attachment of a projector, and showing the diamond-shaped opening through the film-trap.

Figure 3:
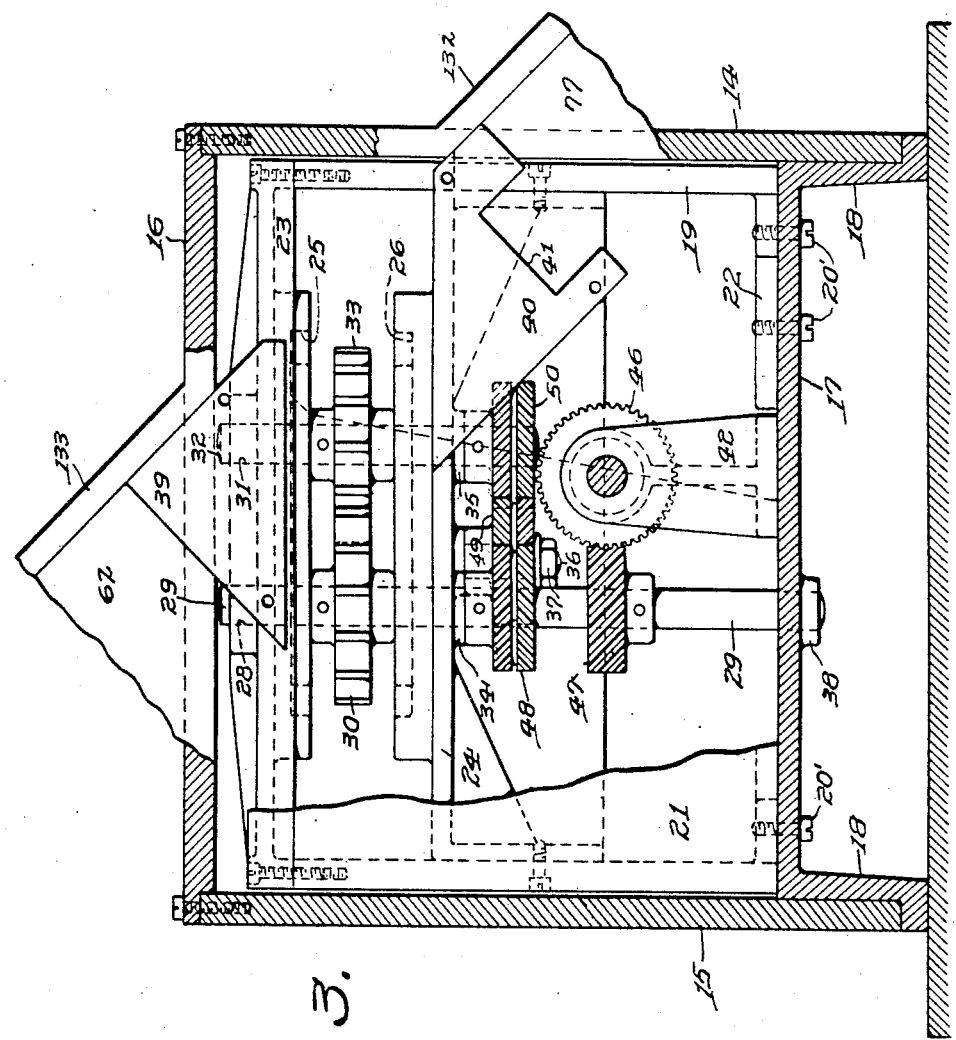

Figs. 15 to 18 inclusive are views on a larger scale than that shown in Fig. 5 of the reflector units.

In Fig. 15 is illustrated a plan view of two adjacent reflector units. Fig. 16 is a rear elevational view of a unit looking in the direction of the travel of the unit through the field of illumination of the lens. Fig. 17 is a front elevational view of a reflector unit looking at it in a direction at right angles to the direction of the travel of the unit through the field of the lens. Fig. 18 is a back view of the unit shown in Fig. 17.

Fig. 19 is a detail of the mechanism for adjusting the film in the film trap, the view being taken on the line 19—19 of Fig. 20.

Fig. 20 is a transverse cross-sectional view of the mechanism shown in Fig. 19, taken on the line 20—20 of Fig. 19.

Fig. 21 is a diagrammatic perspective view of a single duplex total reflector unit with the parts spaced, to show how an image of an object is twice reflected within the reflector unit, the direction of the light therethrough, and the positions of the image on the faces of the unit through which the image passes.

Fig. 22 is a view of a similar reflector unit with the adjacent faces of the unit in substantial contact, the arrangement being that used in the preferred embodiments of my invention.

Fig. 23 is a diagrammatic view showing the relative positions of the film-trap, the film, a pair of reflector units and a reflected image on a screen when one reflector unit is reflecting one-half of one exposure and the other unit is reflecting the complemental half of the adjacent exposure.

Fig. 24 is a view similar to that shown in Fig. 1, but with the film and reflectors advanced to a position wherein one reflector is operative to reflect the major portion of one exposure and the adjacent reflector is operative to reflect to the screen the complemental remainder of the adjacent exposure on the film.

Figs. 25 to 28 inclusive, are diagrams showing how the size of the color disc, and the speed at which it must rotate, are calculated to synchronize it with the film.

Fig. 29 is illustrative of a modified reflector construction wherein the polished or silvered reflector surfaces are on opaque blocks disposed to support the reflected surfaces in the same relative position that the total reflecting surfaces of the total reflecting prisms are arranged.

In order to simplify the description of the mechanism and the relations of the movements of the film and the series of reflectors with respect to the axis of the lens, and to each other, I shall assume the lens to be on a front substantially vertical wall of the casing, the axis through the lens and through the projector to be horizontal, and the plane within which lies the lens to be vertical; the series of reflectors to travel in a horizontal plane and that in their travel through the field of illumination of the lens they move from left to right advancing toward the plane of the lens (Fig. 5) in a path disposed at an angle of 45° to the axis of the lens; that the plane in which lies the film, is a vertical plane as it passes through the reflected field of illumination of the lens or through the light from the projection lamp and that the film travels downwardly and forwardly making an angle of 45° to the horizontal plane of the travel of the reflector and toward the vertical plane in which lies the lens.

The terms "horizontal" and "vertical" are relative so far as the structure of the mechanism is concerned, for it should be clearly understood that when the device is used as a camera or projector, it may not be held or positioned so that the axis of the lens is absolutely in a horizontal plane and that, of course, when so held, the directions which have been described as vertical may be inclined from the true vertical, but they will still bear the same relative position with respect to the axis through the lens.

And so I have shown on a small scale in Fig. 1, a side elevational view of the casing 1 of the apparatus with the principal axis $a$—$a$ through the lens 2 disposed in a horizontal plane and the plane $p$—$p$ of the lens as a vertical plane; with the film 3 disposed in a vertical plane and traveling downwardly and forwardly, with the median line $b$—$b$ making an angle of 45° to horizontal and vertical planes and more particularly, an angle of 45° to a horizontal plane passing through the axis $a$—$a$ through the lens and an angle of 45° to the plane $p$—$p$ of the lens. I have shown the film as provided with a square exposure 4. When the apparatus is used as a camera, these square exposures 4 will be the successive areas which are exposed to light. When the device is used as a projector they will be pictures on the film. These exposures 4 are arranged with two opposite sides thereof disposed vertically and the other two sides thereof disposed horizontally, the exposures 4 (or the areas to be exposed) being so disposed on the film that a diagonal of each exposure is coincident with the median line $b$—$b$ of the film, and with adjacent corners of successive exposures or areas 4 substantially touching. Thus it is that in each exposure 4 the sides thereof are at 45° to the side edges and the median line $b$—$b$ of the film or tape. In all the figures, the usual film reels from which the film is drawn and to which it is conducted and wound are omitted, for so far as this invention goes they may be of any well-known and approved type.

In Fig. 1 are shown the parts which will be seen from the left-hand side 5 of the casing 1 (when one looks toward the plane of the film); the closure 6 for the film-trap or film-guide; the knob 7 for throwing in and out of operation the color screens; the shutter or closure 8 for closing the opening 9 into the film-trap or film-guide when the device is used as a camera, and for uncovering said opening 8 to admit a beam of light to the film from a projection lamp (not shown), when the device is used to project pictures from a film to a screen; and the knob 10 for framing the exposure 4 with respect to the opening through the film box and with respect to the reflectors (referred to again below). This Fig. 1 is in the nature of a key to the position of various mechanisms shown in the larger views wherein some parts of the structure have been necessarily broken away or entirely omitted for the purpose of showing the constructions behind or to the rear of the parts not illustrated, and to avoid the necessity of laying out all the mechanisms in assembled relations which would complicate the drawings and make them difficult to understand. This Fig. 1 ties together features of construction particularly shown in Figs. 2 to 5 inclusive, to which reference will now be made.

The casing 1 comprises the said left-hand side 5 behind which is positioned the film-trap or gate 11, a perpendicular right-hand side 12 through which extends the power shaft 13, a front side 14 which is also shown as vertical, except where it is arranged to house the film-trap on the left-hand side of the casing, a back side 15 which is vertical, a top side 16 which is, in the main, in a horizontal plane except where it forms a part of the film-trap closure, and a bottom side 17, having a rather deep downwardly extending flange 18 surrounding the same and providing ample surfaces to which the sides 5, 12, 14, 15 of the casing 1 may be securely fastened in any suitable manner. The result is that the plane of the bottom wall 17 of the casing is elevated considerably above the bottom edges of the said side walls.

Within the forward right-hand corner of the casing (see Fig. 5) but slightly spaced from the front side 14 and from the right-hand side 12, is a bracket 19 substantially right angled in horizontal cross-section and having a bottom flange 20 into which is threaded a bolt 20', by means of which it may be securely fastened to the bottom plate or side 17. Diagonally across the casing 1 and similarly located in the left-hand corner adjacent the rear wall 15 and side wall 5 is a similar bracket 21, substantially right angled in horizontal cross-section and extending along the left-hand side wall 5 and rear wall 15 of the casing and which may also be provided with a bottom flange 22 and bolt 22' by means of which it also is secured firmly to the bottom plate or wall 17. These two brackets 19 and 21 form rigid supports for two substantially parallel cam plates 23 and 24, rigidly secured to said brackets 19 and 21 in any suitable manner. These two plates are, in general, horizontally disposed, and their adjacent faces are parallel and are respectively provided with the endless path cams or channels 25 and 26 respectively, said path cams being complementally alike and one vertical over the other and arranged in the adjacent sides of the plates 23 and 24. In these cam paths a continuous series of reflector units 27 are caused to travel through an endless or looped path disposed in a horizontal plane during the operation of the device and the direction of the straight portion of the cams, adjacent the front side 14, is in a vertical plane $c$—$c$, making an angle of 45° to the plane $d—d$ of the film and an angle of 45° with the axis $a—a$ through the lens, (see Fig. 5), as will be referred to again below.

The upper or top plate 23 is also provided with two bearings, the axes of which are vertical and parallel. Of these bearings, the bearing 28 is the upper bearing for the vertical shaft 29 which carries rigidly secured thereto, a sprocket wheel 30 revolving midway between the plates 23 and 24 adapted to drive the reflector units 27 through their endless path by the engagement of the teeth thereof with the backs of said unit. The second bearing 31 in the top plate 23 is the one in which the upper end of the vertical shaft 32 is journaled, said shaft being provided with a sprocket wheel 33 like the sprocket wheel 30, and which is rigidly secured to said shaft and is adapted to similarly engage the backs of reflector units 27. In alinement with these two bearings in the upper cam plate are two bearings in the lower plate 24, namely, a bearing 34 for the shaft 29 and bearing 35 for the shaft 32. The lower cam plate 24 is also provided with a stud shaft 36 extending downwardly from the under side thereof and having a nut 37 threaded over the lower end thereof. The bottom plate 17 is also provided with a bearing 38 for the lower end of the shaft 29. The gearing of these shafts together will be referred to below.

The left-hand side of the top plate 23 is provided with a vertically disposed triangular shaped bracket 39 having a flat triangular face extending upwardly from the plane of the top plate 23 and the adjacent side edge of the lower or bottom plate 24 is also provided with a depending bracket 40 having a flat face lying in the plane of the flat face of the bracket 39 and the face of this bracket 40 is also triangular, except for a notch 41 in an edge thereof (see Fig. 3) the purpose of which will be referred to below. These brackets 39 and 40 are for the purpose of forming a support for the film-trap or gate 11.

Mounted on the bottom plate 17 of the casing 1 are two brackets 42 and 43 providing alined bearings 44 and 45 for the power shaft 13 which may be revolved when the device is used as a camera, by a crank (not shown) in the usual way, or by a pulley (not shown) when the device is used for projecting pictures, and is driven by a motor. On this shaft 13 is rigidly mounted a driving gear 46 which is preferably of the skew gearing type and adapted to mesh and drive a gear 47 rigid with the vertical shaft 29 well below the lower cam plate 24 and above the bottom plate 17. Above this gear 47 another gear 48, preferably of the herringbone type, is rigidly mounted on the shaft 29 and meshes with an idler gear 49 on the stud shaft 36 which in turn meshes with a gear 50 like the gear 48 and rigidly mounted on the lower end of the vertical shaft 32, whereby the two shafts 29 and 32 and the sprocket wheels 30 and 33 are caused to rotate in the same direction and at the same speed of rotation. It is by the sprockets 30 and 33 that the train or series of reflector units is drawn through an endless path of travel as will be explained below.

But it must be understood that the gearing between the spindles 29 and 32 may be disconnected or omitted without substantially altering the operation of the series of reflector units, for a single driven sprocket wheel is sufficient to drive the reflector units, as will be referred to again below.

Also mounted on the main power or drive shaft 13, to turn therewith, is a skew gear 51 (see Figs. 4 and 2) which meshes directly with and drives a skew gear 52 mounted on a shaft 53 extending from the front to the rear of the casing respectively, at an angle of 45° to the horizontal. This shaft 53 is located along the inner wall of the right angled bracket 21 and parallel to the left-hand side 5 of the frame or casing 1 and parallel to the film gate 11. This shaft 53 is mounted in suitable bearings 54 and 55 and carries at its opposite ends two beveled gears 56 and 57. The upper gear 56 meshes with a similar miter or bevel gear 58 rigid with the shaft 59 which is mounted in suitable bearings 60, 60 provided in a bracket 61 secured to the inner face of that part 62 of the top wall or plate 16 which houses the upper end of the film-trap 11. This shaft 59 carries two sprocket gears 63, 63 to engage the usual rows of perforations 3' extending longitudinally of a film or tape 3 adjacent the opposite edges thereof.

Cooperating with said sprocket wheels 63, 63 are two presser rollers, 64, 65, mounted to freely rotate on studs 66, 67 respectively carried by an arm 68 pivotally mounted on a stud 69 on the bracket 61. On the bracket 61 is also mounted a strip of resilient spring metal 70, the outer free end of which is provided with a semicircular recess 71 adapted to fit around or over the free end of the arm 68 and yieldingly hold the two presser rollers 64 and 65 against the toothed wheels 63, 63. These rollers 64 and 65 are provided with circumferential grooves 72 into which the teeth of the toothed wheels 63 project as the toothed wheels revolve upon their axes. This constitutes a mechanism for drawing the film 3 from the film box (not shown), usually mounted on the casing at the upper end of the film-trap 11. The film is held against the cylindrical surfaces of the sprocket wheels 63, 63 at the base of the teeth thereof by the presser rollers 64 and 65, and prevent the film 3 from rising up on the teeth of the sprocket wheels 63 while the machine is being operated.

The lower beveled gear 57 similarly meshes with a miter gear 73 rigidly secured to a shaft 74, mounted to rotate in a pair of bearings 75, 75 in a bracket 76 secured to the vertical wall 77 forming a part of the front side 14 of the casing near the bottom thereof and by which is enclosed the film-trap 11. On the shaft 74 are a pair of toothed wheels 78, 78 like the toothed wheels 63, 63 above described. The bracket 76 is provided with a shaft 79 on which is pivotally mounted an arm 80 provided with two studs 81 and 82 on which are mounted to rotate respectively, two presser rollers 83 and 84 in the same manner as the presser rollers 64 and 65 are mounted and operate, the end of the arm being also engaged by a spring 85 having a recess 86 near the end thereof to fit around the end of the arm 80. As shown in Fig. 6, the shafts 59 and 74 and the sprocket wheels 63, 78 respectively mounted thereon are arranged to be driven in an anti-clockwise direction at the same speed. Adjacent the sprocket wheels 63 and having a relatively sharp free end lying close to the surfaces thereof and between the sprocket wheels 63 and the presser roller 64 is a stripper 87 for freeing the film 3 from its engagement with the teeth after it has been passed between the sprocket wheels 63 and the roller 64, and the sprocket wheels 78 are similarly provided with a similar stripper 88.

It is now in order to describe the film-trap gate 11 shown in section and in relation to the film driving mechanism in Fig. 6 and in detail on a larger scale in Figs. 7 to 13 inclusive. This film-trap is securely mounted on the two substantially triangular shaped brackets 39 and 40, the front faces of which are shown in Fig. 3. The film-trap or gate comprises a substantially flat rectangular metal base plate 89, the underside of which is bolted to the brackets 39 and 40 and the outer side of which is provided with a centrally disposed longitudinally extending shallow groove or channel 90 and a rhomboidal or diamond-shaped opening 91 through the base from the bottom of the channel 90. On opposite sides of the groove 90 are two narrow flat shoulders 92, 92 upon which the opposite marginal edges of the film 3 rest in sliding through the trap. On the top edge of the base plate 89 are two outwardly projecting lugs 93, 93 upon which the top cap or cover 94 is pivotally connected by pivot pins 95, 95 passing through said lugs 93 and through lugs 96, 96 on the top edge of the cover.

The outer plate or hinged member 94 of the trap is provided with a longitudinal channel or groove 97 complemental to the groove 90 in the base plate and in alinement with the diamond-shaped opening 91 in the base plate 89, the hinged plate 94 is provided with a rectangular opening 98 within which are fitted a presser plate 99 and the parallel arms 100 located between the side edges of the presser plate 99 and the side walls of the opening 98. This presser plate is also provided with a diamond-shaped opening 91 in axial alinement with the diamond-shaped opening 91 in the base plate 89.

One end of each of the arms 100 is pivotally attached to the inner wall of the opening 98 by pivot pins 102. The opposite ends of the arms 100 are pivotally attached to the presser plate 99 by pivot pins 103. In suitable recesses in the front side of the top plate are seated two presser springs 104, 104. These springs are leaf springs and their free ends press against the outer surface of the presser plate 99 tending to force the plate 99 inwardly thereby tending to hold it against the ledges 92—92 (see Fig. 13). It is between the presser plate 99 and the seats or ledges 92 that the ledges of the film slide during their travel through the film-trap, the presser plate tending to hold the film on the seats 92, 92 constantly in the same plane while passing over the openings 91 and 91 in the base and top plates respectively. The side walls of the diamond-shaped opening 91 are preferably beveled outwardly as clearly shown in Figs. 10 to 13 so that the opening is slightly larger on the rear side of the base plate 89 than on the front side of it. The side walls of the diamond-shaped opening 91 in the presser-plate 99 are also beveled but in the opposite direction so that they diverge outwardly from the film within the film-trap. The free ends of the springs 104 tend to force the presser plate inwardly but their inward movement is limited by a pair of stop plates 105, 105 secured to the outer face of the presser plate 99 and having tongues 105' overlying the face of the rigid top plate.

As is indicated in Fig. 10, the side edges of the presser plate do not press tightly against the film 3. They just clear the edges so that the film "floats" and is confined to move in one invariable vertical plane as the film passes between the diamond-shaped openings 91 and 101 in the film gate or box.

At the upper end of the film-trap 11, the base plate 89 and the hinged plate 94 are respectively provided with one of a pair of cooperating guide rollers 106, 106 between which the film is drawn upon its entry into the film-trap, and at the opposite lower end of the film-trap 11, the hinged plate 94 is provided with a roller 107 adapted to engage the upper surface of the film 3 in leaving the trap and this roller 107 is provided with a pair of circumferential grooves 108, 108 into which project the teeth 109 of the draft sprocket rollers 110, 110 for drawing the film through the film-trap (see Fig. 6). The teeth 109 of the draft rollers 110 are adapted to enter the usual perforations 3' in the margins of the film 3, but the cylindrical faces 112 of the draft rollers 110 are considerably wider than the projections or teeth 109 so that the film will be pressed between the cylindrical faces 112 of the rollers 110 and the cylindrical surfaces of the small rollers 107 on opposite sides of the grooves 108 when the top or cover 94 is closed and in operative position.

These draft rollers 110 are preferably rigid with a common sleeve 113 which, in turn, is rigidly secured to a shaft 114 which is journaled in bearings 115, 115 carried by arms 116, 117 extending from the bracket 76 (see Figs. 1 and 6). The lower end 114' of the shaft 114 is preferably squared and passes through cylindrical bearings 118 in the arms 119, 119 of a block 120, the square end fitting a squared hole in a skew gear 121 arranged to mesh with and be driven by the gear 51, (see Fig. 1). This block 120 is provided with two parallel circular holes 122, 122 (see Fig. 20) through which pass stationary guide rods 123, 123. The upper ends of these guide rods 123 are rigidly secured in suitable openings in the arm 117 by set screw 124 and the lower ends of said guide rods 123 are fitted into suitable holes passing through a bracket 125 attached to the casing, (see Figs. 1 and 19). Between said rods 123 is the shaft 79 provided at its upper end with the knurled knob 10 outside of the casing (see Fig. 1) and by means of which the shaft 79 may be manually rotated. The inner end 79' of said shaft 79 is screw-threaded to fit corresponding screwthreads in the said block 120 (see Fig. 19). The rod or shaft 79 is journaled in alined bearings in the bracket 76. When the parts are assembled as shown in Fig. 1, a rotation of the knob 10 and by it the skew gear 121 in mesh with the skew gear 51 will slide the block 120 in one direction, causing the skew gear 121 to rotate slightly on its axis, and when the knob is turned in the opposite direction, the block 120 will move in the opposite direction and the skew gear 121 will rotate in the opposite direction.

The longitudinal movement of the block with respect to the rod 79 is by reason of the engagement of the screw-threaded part 79' of the rod with the block 119 as shown in Fig. 19. This is the arrangement whereby the film may be adjusted longitudinally of the film-trap and with respect to the diamond-shaped opening 91 through the film-trap and also with respect to the reflectors to be described below. The primary object of this adjustment is to "frame" the exposure or picture 4 on the film with respect to the opening 91 through the film-trap.

The lower end of the base plate 89 is provided with a pair of notches or recesses 126—126 within which the draft rollers 110 extend. The front edge of the base plate 89 is preferably provided with two spring catches 127, 127 cooperating respectively with studs 128, 128 in the top plate or cover 94. The spring catches 127 are provided with openings 129 which register with the studs 128 when the cover 94 is closed down against the base plate 89.

On the inner side of the cover or top plate 94, is the groove or channel 97 running longitudinally thereof and on opposite sides of the rectangular opening 98 therein and on each side of this channel 97 are narrow plane surfaces 130, 130 over and opposite the ledges 92, 92 in the inner plate 89 and spaced from the surfaces of said ledges 92 by substantially the thickness of the film so that the film will slide smoothly between them but without motion in a direction transverse to the plane of the film. The springs 104 bear against the presser plate 99 lightly, so that the plate just touches the film and the film is substantially floatingly supported between the presser plate and the ledges 92 of the base plate 89. The film trap or gate 11 is mounted on the brackets 38, 39 in such a manner that the longitudinal median line of the passage therethrough for the film lies in a vertical plane and makes an angle of 45° with the horizontal, the inclination running from the rear of the machine or casing 1 forwardly and downwardly, as clearly shown in Fig. 2.

In order to provide a suitable space within the casing for the film-trap or gate 11, the bottom wall or side 17 of the casing is provided in the front left-hand corner (looking from the front of the machine toward the lens) with a re-entrant angle 131, the sides of which are at right angles to each other and parallel to the front and left-hand sides of the casing respectively, and into this space thus provided is housed the mechanism for driving the take-up rollers 78, the mechanism for framing the exposure on the film to the diamond-shaped opening 91 in the base, the detailed construction of which has been above described. The front wall 14 is provided with an outwardly projecting wall 77 above described, and on the top side with a section 132 at right angles to the portion 77 and serving to enclose the upper side of the mechanisms above described for impelling the film through the film-trap 11 and extending downward parallel to the direction of the film-trap; that is to say, in a plane making substantially an angle of 45° with the horizontal. This section 132 extends thus to a position substantially in the plane of the rear side of the film-trap or gate 11 as indicated in Fig. 5.

The top wall 16 of the casing is provided with a similar vertically disposed wall 62, above referred to, and with a section 133 to enclose on the top side the upper ends of the toothed wheels 63 and pressure rollers 64 and 65. Along the free edges provided by the sections 132 and 133 and hinged thereto by hinges 134 is the cover or closure 6 for the film-trap and mechanism, cooperating therewith, the position of which is clearly indicated in Fig. 1 and portions of which are shown in Figs. 4 and 5. The upper wall 135 of the cover 6 lies in the plane of the sections 132 and 133 when the lid is closed and the other wall 136 extending at right angles to the wall 135 rests against the upper or inclined slanting edge of the side wall 5 when the lid or closure is closed, and is retained in that position by suitable spring clips 137.

The upper front corner of the left-hand side of the casing above the upper wall 135 of the cover may be closed by a triangular piece or plate 5' (see Fig. 14), which forms a part of the closure 5.

Opposite the space between the toothed sprocket wheels 63—63 for drawing the film to the film-trap and the presser rolls 106 at the upper end of the film-trap or gate 11, the cover or closure 6 is provided with an outwardly swelled portion 138 and opposite the space between the draft rollers 110—110 and the take-up rollers 78—78, the lid or closure 6 is provided with a second outwardly swelled portion 139. As clearly indicated in Fig. 6, the film is not tightly drawn between the rollers 63 and the upper end of the trap nor between the lower end of the trap and the take-up rollers 78, but is flexed outwardly loosely. The swelled portions 138 and 139 are for the purpose of giving room or space within which these loops of film may be formed and maintained and the film may be caused to travel without contact with the casing or with the lid or closure 6.

The circular opening 9 through the wall 136 is in alinement with the diamond-shaped openings 91 in the film-trap (see Fig. 14) and this opening 9 is adapted to be closed by a shutter 8 mounted on one end of a lever 141 having a handle 142. The lever 141 may be mounted on a pivot pin or screw 143 in such a manner that by swinging the handle 142 in one direction, the shutter 8 of the said lever 141 is moved to close the opening 9 and in the other direction the shutter is moved from over the said opening 9 for the admission of light from a projector of light (not shown).

In Fig. 15 is shown a top plan view of a pair of successive reflector units 27 as they would appear when mounted within the machine. Fig. 16 is an end view of the same; Fig. 17 is a view of one unit looking at it from the right of Fig. 16, and Fig. 18 is a view of a reflector unit looking from the left of Fig. 16. It may be regarded as a back view, showing the rollers 153 which fit between the teeth of the sprocket wheels 30 and 33 during the travel of a unit around said sprocket wheels 30 and 33, and the guide rollers 154—155 adapted to fit into the cam grooves 25 and 26 in the upper and lower cam plates 23 and 24 respectively. Each reflector unit 27 comprises a lower prism reflector 144 and an upper prism reflector 145, suitably secured to a block or carriage 146, as by clamps 147 and 148, taking over the edges of a reflector and secured to the base by screws 149. A small rod 140 is preferably placed under the clamps 148 so that the clamp will draw down on the edges of the prism when its screw 149 is driven into the block. In the drawings, I have shown the upper and lower reflector elements 145 and 146 as total reflecting prisms having reflecting surfaces $g$ and $j$ respectively, (see Figs. 21 and 22). I will describe the device as provided with these prisms, but any suitable reflector may be substituted therefor, for each prism has but one reflecting surface. Thus each unit may comprise two plane mirrors 144' and 145' of opaque material having polished or silvered surfaces $g'$ and $j'$ (see Fig. 29).

The lower reflector prism 144 is provided with a plane surface $f$ which is maintained in a vertical plane parallel to the plane of the film during the travel of the reflector through the field of illumination of the lens; an inclined reflecting surface $g$ disposed at an angle of 45° to the surface $f$ and a top surface $h$ disposed in a plane at right angles to the plane of the side or surface $f$. Light entering the side or surface $f$ will be reflected upwardly vertically and out through the top side $h$ of the prism. The upper reflector 145 preferably rests on the lower reflector 144, although this is not necessary, and when so disposed, its lower side or surface $i$ is substantially coincident with the top surface $h$ of the lower reflector 144. But the vertical side $k$ of the upper reflector 145 is disposed in a plane at right angles to the plane of the side $j$ of the lower reflector and the reflecting surface $j$ makes an angle of 45° with the sides $i$, $k$ of the reflector unit 145 so that light entering the lower side $i$ of the upper reflector 145 is reflected by the reflector surface $j$ out of the upper prism at right angles to the plane of the surface $k$ and at right angles to the direction of the light entering the lower prism 144 through the side $j$ and parallel to the plane of the film. A diagrammatic view of the two prisms 144 and 145 separated from each other for the purpose of clearly designating the respective faces thereof, is shown in Fig. 21, while in Fig. 22 is shown the preferred way of substantially superposing the upper reflector on the lower reflector, and in Fig. 29 is shown a similar disposition of plane mirrors acting as reflectors.

Referring now to Fig. 18, and which, for convenience, may be said to illustrate the bottom of a reflector unit, since it is of the side which engages the sprocket wheels 30 and 33, there are shown two parallel side plates 150 and 151 on opposite sides of the block or carriage 146 in which are mounted two parallel pins or axles 152 extending transversely through said plates 150 and 151 and extending beyond them equally on both sides. Between the side plates 151 and 150 and upon the pins or axles 152 are cylindrical rollers 153 very accurately ground to fit and cooperate with the teeth on the sprocket wheels 30 and 33 in the travel of the units 27 through their endless course, determined by the cams 25 and 26, and upon the ends of the pins or axles 152, 152 and on the outsides of the webs 150 and 151 are mounted two rollers 154—154 and 155—155 also accurately ground to fit respectively into the path cams 25 and 26 in the upper and lower cam plates 23 and 24 respectively. The main block or carriage 146 may be composed of two pieces rigidly secured together by screws 156 and a bottom piece 157 fitting between the plates 150 and 151 and secured to the body portion by screws 158 and dowel pins 158'; and the plates 150 and 151 may be fitted against the sides of the bottom piece 157 and secured to the body by screws 159. The ends of the plates 150 and 151 are parallel to each other and are disposed in a plane at right angles to the direction of the travel of the unit in the machine in the straight portions of their course between the sprocket wheels. The forward ends of the plates on one unit will abut squarely against the rear end of the similar plates of the reflector unit ends in advance thereof as clearly shown in Figs. 5 and 15.

The path of the axes of the rollers 154 and 155 between the sprocket wheels 30 and 33 is tangential to the pitch line of the sprocket wheels 30 and 33, but around the sprocket wheels 30 and 33 the path is not strictly concentric with the axes of the sprocket wheels. The curvature of the cam paths 25 and 26 is slightly less than the curvature of the pitch line of the sprocket wheels with the result that in traveling around the sprocket wheels, the reflector units move slightly outwardly or radially on the teeth of the sprocket wheels for a distance sufficient to cause a reflector unit to advance slightly with respect to the unit behind it as it travels around the first half of the curved portion of its path, thus avoiding any binding of the units one against the other as they deviate from a straight line travel. Conversely, the second half of their curved travel around the sprocket wheel, a reflector unit gains slightly on the reflector ahead of it until by the time a unit is started to move in a right line the forward ends of the webs 150 and 151 of the reflector unit will engage against the rear ends of the like webs of the unit next in advance.

When, however, the shaft 32 is not driven from the shaft 29 by gearing such as gears 48—49—50, and the sprocket 33 is consequently an idler, the train of reflector units, coming from the sprocket 30, will drive the sprocket 33 and the sprocket 33 will slightly space the units and bring them together again and impel the units leaving the sprocket 33 through the straight run to the sprocket 30, as is above described when the gears 48—49 and 50 are employed.

Referring now to Fig. 5, it is to be observed that the three reflector units on the right-hand side of the figure are in that straight portion of their travel wherein they are passing through the field of illumination of the lens. The path $m$—$m$ of the center of the reflector surfaces lies in a horizontal plane making an angle of 45° with the axis $a$—$a$ through the lens and an angle of 45° with the plane $p$—$p$ within which lies the lens. The plane of their movement is also in a vertical plane in which lies the path $m$—$m$ (see Fig. 5) making an angle of 45° to the plane $d$—$d$ of the film (which passes downwardly between to the rollers 106 at the top of the film-trap or gate 11). The movement of the film is from the left to the right of Fig. 5. While passing through that portion of their path which lies in the field of illumination of the lens, the faces $f$ of the reflectors 144 are maintained always parallel to the plane of the film and the faces $k$ of the reflectors 145 in a plane at right angles to the plane of the film and to the axis through the lens. The direction of the travel of the reflector units through the field of the illumination of the lens is indicated in Fig. 5 by the arrow 160 and the anticlockwise direction of the rotation of the sprocket wheels 30 and 33 is indicated by the arrow 161.

A series of pictures which have been taken through color screens may be used to produce pictures in natural colors on the screen. To this end I have provided a rotating color screen. Referring to Fig. 4, on the left-hand side of the apparatus, on the end of the shaft 13, I mount a spur gear 162 and between it and the gear 51, the shaft is provided with a sleeve 163 having an arm 164 at the outer end of which is stationarily secured a stud 165 extending parallel to the shaft 13. On this stud 165 is loosely mounted a sleeve 166 fitting between the face of the arm 164 and the inner side of the left-hand side wall 5. Over this sleeve 166 is mounted to rotate another sleeve 167 having a flange 168 at the outer end thereof adjacent the side 5 of the casing. Over this sleeve 167 is fitted another sleeve 169 having at its left-hand end (Fig. 4) a flange 170. Between the flanges 168 and 170 are clamped two circular disk-like members 171' and 171'' provided with sector-like openings 173 and 173, separated by narrow radial arms 172, respectively in registration with each other throughout a circular course around the adjacent peripheries of the disk-like members 171' and 171''. The adjacent edges of the sector-like openings 173 and 173 are beveled or chamfered inwardly to receive between them pieces 174 of colored glass or celluloid. The end of the sleeve 167 is provided with a gear 175. The gear 175, the sleeve 169, the disk-like members 171' and 171'' and the flange 168 are preferably assembled and secured together as a unit by studs 176 (only one shown Fig. 4), and the two members 171′ and 171″ become a unitary color disc 171.

The arm 164 is also preferably provided with a bearing stud 177 upon which is freely mounted to rotate an idler gear 178 meshing with the gear 162 and with the gear 175 respectively, so that when the shaft 13 and the gear 162 are rotated, motion will be communicated through the gears 175 and 178 to the color disc 171 and to successively cause the glass in the sector-like openings to pass a given point in a circular path at a speed which is synchronized to the speed of the film.

The side wall 5 of the casing is provided with an arc-shaped slot 179 through which projects the stud 165. The outer end of the stud 165 is provided with a head 180 and fitting within a sleeve 181 outside of the wall 5. This sleeve at its inner end fits around the stud 165 and its outer end is closed by the knob or handle 7. Between the inner end of the sleeve 181 and the head 180 is a spring 182 under compression, tending to hold the inner end of the sleeve 181 in a recess 183 at the upper end of the arc-shaped slot 179 when the stud 165 and the parts carried thereby are at their highest position in the arc-shaped slot 179. In this position, shown in Figs. 4 and 1, when the disk is rotated, each sector-like opening 173 in the color disc 171 will successively substantially sweep or pass over or across the entire area of the diamond-shaped opening 91 through the film-trap.

The speed at which the color screen 171 thus constructed revolves in such as to keep it in registration with an exposure and with the coacting reflector throughout their travel across the diamond-shaped opening 91 and to hold the succeeding color screen in registration with the succeeding exposure and reflector during its travel across the said opening. The colors in the segment-like openings in the color screen are substantially like those of the filter through which the exposures were made, and are arranged in the same sequence or order so that when light is admitted through the opening 91 in the side 136 of the film-trap closure 6 (by the opening of the shutter 8) the light projected against the film will be precolored with substantially the same color as that of the screen through which the exposure was made. When the color screen is in its upper position, as shown in Figs. 1, 2 and 4, the engagement of the end of the sleeve 181 in the recess 183 will retain the parts in that position. When, however, it is not desired to use the color screen, the operator merely has to draw outwardly on the knob 7, lifting the bottom of the sleeve 181 out of the recess 183, whereupon the handle may be moved downwardly through the arc-shaped slot 179 to swing the color screen down out of registration with the hole or opening 8 in the wall 136 of the closures or cover 6, whereupon a brilliant white light may be similarly admitted through the opening for projecting ordinary pictures on the film to a screen.

From the above description it must now be plain that the median line $b$—$b$ of the film 3 makes an angle of 45° with vertical and horizontal planes, and that the direction of the movement of the film is from the upper left-hand end of the rear wall 50 of the machine forwardly and downwardly toward the plane $p$—$p$ of the film and toward the left-hand end of the bottom edge of the front wall or side 14 of the machine; that the centers of the set of lower reflector elements 144 is in a horizontal plane coincident with the center of the diamond-shaped openings 91 and 91 of the film-trap and that the direction of the travel of said centers of said lower set of reflectors is in a vertical plane which makes an angle of 45° with the plane of the film and with the axis $a$—$a$ through the lens 2 and that the centers of the upper set of reflectors 145 is in a horizontal plane coincident with the axis $a$—$a$ through the lens 2 and that the direction of the motion of the centers of the upper reflectors is also in a vertical plane making an angle of 45° with the plane of the film and 45° with the axis $a$—$a$ through the lens. It is also to be noted that the movement through the field of illumination of the lens of the reflector units is from the left-hand side of the machine forwardly and toward the right-hand side in a path making an angle of 45° with the plane of the film and with a vertical plane passing through the axis $a$—$a$ of the lens, e. g. the plane $p$—$p$ of the lens.

The linear speed of the film in the direction of the travel of the film is the same as the speed of the series of reflectors in the direction of the travel of the reflectors through the field of illumination of the lens. Hence it is that the component in a horizontal plane of the speed of the travel of the film from the rear side of the casing toward the front side of the casing or in a direction parallel to the axis $a$—$a$ of the lens will be the same as the component in a horizontal plane of the speed of the film from the rear wall of the casing toward the front wall of the casing and in a direction parallel to the axis $a$—$a$ of the lens.

So referring to Figs. 23 and 24 in which the perspective diagrammatic views of two positions of the apparatus, to illustrate principles of the operation of the mechanism, the diamond-shaped opening 91 may be taken to be the opening through the outer side of the film gate or trap 11 to limit the area of the film exposed to the light at any time and the two successive exposures or pictures on a film are numbered 4a and 4b in order to facilitate the explanation. In the position indicated in Fig. 23 the light admitted through the opening 91 will illumine the lower half of the exposure 4a on the film 3 and the upper half of the exposure 4b on the film. Of course, the light will illumine the space between the exposures, but, as will be presently seen, it will not be caught on the reflector units or reflected out of the lens.

I have similarly numbered two consecutive reflector units 27a and 27b with the reflector elements of each also distinguished by their integers provided with a characteristic like that given to the unit reflector. Thus the lower reflector element 144a and the upper reflector element 145a are parts of the reflector 27a and the lower reflector element 144b and the upper reflector element 145b are like parts for the reflector units 27b. When the vertical sides of the exposure 4a having been adjusted with respect to the diamond-shaped opening 91 and the reflector 27a so that the vertical sides of the exposure or picture 4a coincident with the vertical edges of the face $f$ of the lower reflector element 144a, then the lower half of the exposure 4a on the film will coincide with the upper half of the face $f$ of the reflector element 144a but no light admitted through the opening will strike any other part of the surface $f$ of the reflector 27a.

Similarly the light will illumine the upper half of the exposure 4ᵇ and this portion only of the exposure 4ᵇ will be reflected to the lower half of the face *f* of the reflector element 144ᵇ of reflector 27ᵇ. Following this image through the reflector unit 27ᵃ the picture on the face *f* will go through the unit until it strikes the upper half of the reflector surface *g*, whereupon it will be reflected upwardly to remote half of the reflector surface *j* whence it will be reflected out through the right-hand half of the face *k* of the reflector unit 27ᵃ which is next behind the reflector unit 27ᵇ, in their travel through the field of illumination of the lens and will be thrown to form a complemental one-half of an image 184 on the screen.

Similarly, the light through the upper half of the picture 4ᵇ will be caught by the lower half of the face *f* of the reflector 27ᵇ whence it be reflected from the lower half of the reflector surface *g* upwardly to the left-hand half of the reflector surface *j* and thence outwardly through the left-hand half of the face *k* to form the other half or portion of the image 184 on the screen. The two parts of the picture on the screen are complemental and form a whole or complete picture, half of which comes from the exposure or picture 4ᵃ on the film and half from picture 4ᵇ.

From the above description and by reference to Fig. 23 it will now be plain that the shape of the diamond-shaped opening 91 in the film-trap is that of a parallelogram in which the long sides *x* are substantially twice the height of the picture or exposure; the short sides *y* are substantially equal to the diagonal of the picture; the distance between the sides *x*, *x* is substantially equal to the width of a picture; the small angles are 45° each, and the larger angles 135° each.

Now considering a third position of the moving parts of the apparatus, shown in Fig. 24. The film 3 has advanced a distance corresponding to three-fourths of the width of an exposure. Meanwhile, in a horizontal plane the vertical edges of the face *f* on the reflector units 127ᵃ and 127ᵇ have been maintained in alinement with the vertical edges of the two exposures 4ᵃ and 4ᵇ respectively for they move at the same rate of speed and the components of their motion in a horizontal plane are alike, although the film is moving downwardly at an angle of 45° to the horizontal and the series of reflectors are moving horizontally at an angle of 45° to the vertical plane in which the film lies. But in so moving the picture 4ᵃ will also have moved downwardly into the rectangular field of light through opening 91 and over the face *f* of the reflector 27ᵃ. But the reflector has not remained stationary. It has a component of its motion in a horizontal plane at right angles to the plane of the film. It moves away from the film in a horizontal plane and its rate of movement in a horizontal plane at right angles to the plane of the film is the same as the rate of the component of the motion of the film in a vertical direction with the result that the image remains stationary with respect to the screen while the reflector moves toward the stationary image. Similarly, the image on the reflection of the picture 4ᵇ has moved downwardly on the face *f* of the reflector 27ᵇ and consequently on the face *k* of the reflector 27ᵇ and that reflector also has been moving away from the film at the same rate of speed that the reflector 27ᵃ has. Therefore, that portion of the picture which still remains on the face *k* of the reflector 27ᵇ and as the right-hand portion of the image 184 on the stationary screen remains stationary. The action, therefore, is as if the vertical line 184′ on the reflected image 184 between the two parts thereof which are received from two adjacent pictures on the film sweeps from left to right over the stationary image 184 on the screen. The action is one comprising a continuous replacement in the reflected image 184 of the portion of the picture reflected from the exposure 4ᵇ by that reflected from the exposure 4ᵃ until the reflectors move to a point wherein the horizontal edges of the exposures on the film coincident with the horizontal edges of the reflector 27ᵃ at which time the picture on the screen will be reflected for the instant by the reflector 27ᵃ, whereupon that picture will be similarly progressively replaced by increasing portions of the succeeding picture on the film.

In this way I maintain stationary on a screen a picture projected through a continuously open lens as reflected from a series of continuously moving reflectors receiving each a portion of a picture from a continuously moving film where on the vertical edges of two exposures on a film are coincident with the two adjacent edges of a pair of reflector units.

Since a reflector unit moves toward the lens as fast as it moves away from the film through the field of illumination of the lens, the optical distance between the film and the lens is maintained constant. Since the direction of the film is at an angle of 45° to the horizontal plane and the direction of the series of reflectors is at an angle of 45° to a vertical plane and since the reflectors and the film are both driven at the same rate of speed, having once framed a picture 4 on the film with a surface of a reflector, the machine can thereafter be continuously run without any lack of alinement, or registration. No mechanical difficulty is presented in constructing this apparatus, for it is comparatively easy to dispose the film so that it may travel in a relatively vertical plane at an angle of 45° to the horizontal and to dispose the course of the series of reflectors in a plane which makes an angle of 45° to the axis through the lens. Nor is any mechanical difficulty involved in causing two shafts to rotate at the same speed whereby the linear speed of the film and of the reflectors is the same but in different directions.

The diagrams comprising Figs. 23 and 24 have been made just as simple as possible in order to illustrate clearly the manner in which the co-operating parts of two adjacent pictures are reflected from the film through the reflector units to the screen and, conversely, when the apparatus is used as a camera, the passage of light through the lens and through the reflectors to a sensitized film, and in these figures the effect of the lens is disregarded or omitted. It is well understood that the action of the lens of a camera or projector is to invert the scene or the reflected image respectively and, therefore, what I have termed the picture 181 on the screen is in reality only what one would see upon looking into the lens opening in the casing, namely, a part of the picture showing on one reflector surface and the complemental part of the picture showing on the other reflected surface both reflections making one complete image. If the drawing were to be the exact illustration of the positions of a picture on the screen then the pictures appearing on the film and on the surfaces of the reflectors as illustrated would have to be inverted and these inverted images would have to be rectified or reinverted by the lens to make the projected image on the screen proper with respect to the horizon, but such a showing would merely complicate the drawing and add nothing to the understanding of the optical principle upon which the invention is predicated.

It should be further pointed out that since the path of the travel of the reflector units is at an angle to the axis of the lens, the motion of the reflector units has two components at right angles to each other, one in a direction away from the plane of the film and the other in a direction toward the plane in which is the lens and because the angle of the path of the reflectors is 45° to the plane of the film and to the axis of the lens, the reflector units, in traveling in a given distance, approach the said plane of the lens or the plane of the screen, or the optical center of the lens by a distance equal to that which it recedes from the plane of the film and the focal distance is maintained constant.

The beam of light coming to a reflector surface $g$ is in a plane parallel to the axis of the lens and normal to the plane of the film; the light from the reflector surface $g$ is reflected vertically against the reflector $j$; and the light received by the reflector surface $j$ from the reflector surface $g$ is reflected by the reflector surface $j$ outwardly in a plane parallel to the plane of the light going to the reflector surface $g$ but in a direction at right angles to that of the light striking against the reflector surface $g$; or looked at from another point of view, the direction of the light reflector from the reflector surface $j$ is parallel to a plane normal to the direction of the light striking against the reflector surface $g$.

The length of the straight portion of the path of the reflector units through the field of illumination of the lens is preferably made as long as three reflector units, for as soon as one reflector unit moves out of the light projected through the diamond-shaped opening 91, the second unit behind it begins to become operative to reflect to the screen, the complemental portion of the picture preceding it and the first and third reflectors should be and preferably are in a right line at that time.

It should perhaps be further stated that the sprocket wheels 63 draw the film from the film reel (not shown) into the casing; that the sprocket wheels 110 draw the film through the film box and that the sprocket wheels 78 draw the film from the casing to deliver it to a film reel (not shown) on the outside of the lower end of the apparatus. Because of the slack or looped portion of the film between the rollers 63 and the upper rollers 106 of the film-trap and between the rollers 110 and the take-up rollers 78, the adjustment of the film within the film box to frame an exposure or picture with a reflector with which it cooperates, is readily effected by the mere turning of the knob 10 and without necessitating a rotation of either the drawing rollers 63 or the take-up rollers 78. The peripheral speeds of the rollers 63, 110 and 78 at the surface thereof are alike so that after the film has been once adjusted in the film box and the picture framed, the same amount of slack is maintained at the ends of the film-trap throughout the operation of the device.

The determination of the size of the color disc 171 and the speed at which it must be rotated, will depend upon several factors, among which are the space available for its installation, the number of color openings or windows 173 desired or necessary, and the number of colors in a series or the sequence of color filters through which the negative was made in making the original exposure.

It should here be made plain that in making the exposures for color photography and in projecting pictures in natural colors on a screen, in using my apparatus above described for that purpose, each exposure is made through one filter of a set or series of color filters and in projecting with my apparatus the light from the projector lamp or light is pre-colored with the color corresponding to the color of the filter through which that particular exposure was made. Thus, in three color work, the filters and the color screens would be arranged in a definite series, e. g., red, yellow, violet or blue for each exposure, each picture being subjected to one color only of said series of colors.

The number of openings in the disc should be greater than four, because the angles at the corners of the exposures on a film are 90° and since in two and three color work the windows in the disc must accommodate and support a recurring series of two or three differently colored screens to the series, there should be at least six openings or windows 173 in the disc 171, but there may be a greater number of openings, i. e., a multiple of 2 or of 3, and not less than six, except that if 5 filters were to be used, the disc 171 might have 5 openings, or a multiple of 5.

The angle subtended by the diagonal of a single exposure measured in the line 2—2 of the travel of the film, will be 360° divided by the number of windows to be positioned in the disc, i. e., $$\left(\frac{360}{n}\right)°.$$

Since the number of colors in a series of filters used in color work may be 2, 3 and possibly 4, I have illustrated a construction wherein the number of screen sectors or windows in the disc is 12, because such a disc would be usable without change, (except in the arrangement of colors in the windows) for projecting in natural colors, pictures taken through practically any series of color screens now used for the purpose, namely, 2, 3 or 4 color filters to the series. It follows then, that with a 12 window screen the angle subtended by the diagonal of an exposure on a film will be 30°

$$\left(\frac{360}{12}\right)$$

and the radii of the pitch circle $pc$ will form with that diagonal an isosceles triangle of which said diagonal is the base, the angle at the apex is 30° and the angles at the base are 75°.

In Figs. 25 to 28 is a layout of 5 exposures $4^a$, $4^b$, $4^c$, $4^d$ and $4^e$ on a film 3. The direction of the travel of the central line of the film is downwardly on the line $b$—$b$. The exposure $4^c$ in Fig. 25 is the only exposure showing through the diamond-shaped opening 91 at the time. By striking downwardly from the ends of the diagonal of exposure $4^c$, straight lines each making an angle of 75° with said diagonal, the center C of the pitch circle will be found at the intersection of said lines, and the pitch circle $pc$ will pass through the adjacent corners of the exposures $4^b$—$4^c$ of the exposures $4^c$ and $4^d$ respectively.

It follows then that given the length (s) of the diagonal and (n) the number of windows in the disc, the radius R of the pitch circle (pc) can be readily computed mathematically, from either of the right angle triangles formed by a radial line bisecting the isosceles triangle at its base at right angles.

In Fig. 25 this right angle triangle will be the area bounded by the radius $r^2$, the radius $r^5$ and ½ of the diagonal of the exposure $4^c$.

The angle subtended by the chord $s$ will be $$\left(\frac{360}{n}\right)°$$

and the angle at the apex of the said small right angle triangle will be $$\frac{1}{2}\left(\frac{360}{n}\right)°$$

or $$\left(\frac{360}{2n}\right)°.$$

The formula for determining the radius R of the pitch circle would therefore be $$\sin\left(\frac{360}{2n}\right)° = \frac{\frac{1}{2}s}{R}$$

or transposed $$R = \frac{s}{2\sin\left(\frac{360}{2n}\right)°}$$

In Fig. 26, the film 3 is shown in a position wherein it has advanced in its line of travel from the position shown in Fig. 25 to a point where three-quarters of an exposure $4^c$ shows through the opening 91 and one-quarter of the exposure $4^b$ is exposed within the diamond-shaped opening 91. During this time the radius $r^2$ must have traveled through an arc of 7½° (¼ of 30°) and will still be substantially coincident with the point where the exposures $4^b$ and $4^c$ touch. In Fig. 27, the film has advanced to expose one-half of the exposure of $4^c$ and one-half of the exposure $4^b$ and the color disc must have advanced from its position shown in Fig. 25 through an angle of 15° (½ of 30°) and the radius $r^2$ will now pass through the geometric center $gc$ of the diamond-shaped opening 91.

In Fig. 28, three-fourths of the exposure $4^b$ shows through the diamond-shaped opening 91 and one-fourth of the exposure $4^b$. At this time, the radius $r^1$ substantially coincident with the point where the corners of the exposures $4^a$ and $4^b$ touch each other, but the radius $r^3$ at this time will have moved through 22½° from the position shown in Fig. 25 and it will be well beyond from the point where the exposure $4^c$ adjoins the exposure $4^d$. Since, however, the lower portion of the exposure $4^c$ is below the lower edge of the diamond-shaped opening 91, the lack of registration of the radius $r^3$ with the adjacent corners of the exposures $4^c$ and $4^d$ is immaterial. The portion of the color screen $173^b$ which is active at the time is that part which is still in registration with the upper quarter of the exposure $4^d$ and the radius $r^2$ is still in substantial registration with the adjacent corners of the exposures $4^b$ and $4^c$. After moving through the next 7½° from the position shown in Fig. 28, the radius $r^2$ will be in the position that the radius $r^3$ is shown in Fig. 25. It will now be apparent that the width of the webs or arms $172^a$, $172^b$, $172^c$, $172^d$ constituting the radial sides of the segmental openings or screens 173 should be as narrow as it is possible to make it in order that they may not interfere with the projection of light throughout the area of a picture with which said segment or screen is in alinement during the operation of the device.

For clearness the corners of adjacent exposures are shown in contiguous association, and the length of a diagonal of an exposure is therefore the "spacing" of the exposures but the pictures or exposures may be smaller and not touch whereupon the "spacing" would be the distance between the centers of adjacent exposures, and the radii will bisect the unexposed portion of the spaces between adjacent corners of any two consecutive exposures.

Referring back to Fig. 25, the wall of the segmental opening, sector or window $173^b$ nearest the center C of the disc must pass through the corner of the exposure $4^c$ nearest the said center and if the wall be an arc its radius should not be greater than that distance. Said wall may, however, be a straight line through said corner of said exposure $4^c$ as shown in Figs. 2 and 14 and normal to said radius $r^5$ for the adjacent sides of the rectangular exposure $4^c$ make a substantial angle with such a straight line and such line would not overlie any portion of the adjacent exposures during its transit across the diamond-shaped opening 91.

It is also apparent, referring to Fig. 25, that the point of the diamond-shaped opening 91, which is most remote from the center C, is the lower right-hand corner thereof. Just before the exposure $4^d$ passes below the lower edge of the opening 91, the radius $r^3$ will be a little above and to the left of the position in which it is shown in Fig. 25. At that time, the upper edge of exposure $4^d$ is receiving its light through the window $173^c$ and it must receive light until it shall have passed below the lower edge of the diamond-shaped opening 91. It therefore follows that the outer wall of the window $173^c$ if an arc concentric with the center C must pass through the lower right-hand corner of the diamond-shaped opening 91, at least up to the position shown in Fig. 25. If the outer wall or edge of the windows 173 be a straight line, as shown in Figs. 2 and 14, it should be a tangent to a circle passing through the lower right-hand corner of the opening 91 in order to permit of the free passage of light through the window to the exposure on the film.

From the above it has been made plain that every point in the pitch circle of the color screen must move through an arc subtended by a chord equal to the diagonal of an exposure, or equal to the "spacing" of the pictures, while the film moves the same distance along the line $a$—$b$ of its line of travel. This synchronism is easily accomplished by making the circumference of the draft sprocket wheels 110 a multiple of the diagonal of an exposure on the film or the spacing of the exposures on the film. For example,—If the periphery of the rollers 110 be made six times the diagonal of an exposure (or six times the "spacing" of the exposures) then six exposures will traverse the diamond-shaped opening 91 upon every revolution of the rollers 110.

The rollers 110 are mounted upon and rotate with the shaft 114 which receives its motion from the main shaft 13 through the skew gears 121 and 51. These skew gears are of the same size and of the same pitch of 45° so that the shafts 114 and 113 rotate at the same angular speed.

If, therefore, six exposures are so caused to traverse the opening 91 for one revolution of the draft rollers 110, then in that same length of time six color shutters or screens or windows 173 must traverse over the diamond-shaped opening 91 for every revolution of the draft rollers 110. Since we have assumed the color disc to be provided with 12 openings, it therefore follows that the disc 171 must rotate at one-half the angular speed of the rollers 110. The color disc 171 is driven directly from the shaft 13 through the train of spur gears comprising the drive gear 162 fast on the shaft 13, the idler gear 178 and the driven gear 164 fast on the color disc 171 (see Figs. 2 and 4). Since the shafts 13, 114 and gear 162 rotate at the same angular speed, it is only necessary to make the diameters of the gears 162 and 175 bear the relation of 1:2; that is to say, the gear 175 must be twice the diameter of the gear 162. So constructed, the speed of the disc 171 at the pitch circle will be synchronized with the speed of the film and the disc 171 will rotate at one-half the angular speed of the rollers 110.

Having thus described my invention, what I claim and desire to protect by Letters Patent of the United States is:

1. In an optical apparatus operative in conjunction with a continuously moving film disposed in a plane parallel to the principal axis of the lens, the combination of a continuously open lens, a series of independent disconnected reflector units, means to continuously drive said units in a series in an endless path, a portion of which is straight and disposed in a plane which is parallel to the principal axis of said lens and normal to the plane of said film, said straight portion of said path making an angle of 45° with the principal axis of said lens and with the plane of said film, said driving means engaging the back of each reflector unit as it enters a curved portion of said path, each reflector unit moving out of engagement with said driving means and into direct abutting relationship with the unit next in advance thereof upon its entry into said straight portion of said path and being pushed through said straight portion by its direct engagement with the reflector next behind it.

2. In an optical apparatus, adapted to operate in conjunction with a film disposed in a plane parallel to the principal axis of the lens, the combination of a continuously open lens, a series of independent disconnected reflector units and means to continuously drive said reflector units in a series in an endless path, the ends of which are curved and a portion of which between said curved portions is straight and disposed in a plane which is parallel to the principal axis of said lens and normal to the plane of said film, said straight portion of said path making an angle of 45° with said principal axis of said lens and with the plane of said film, said driving means being at the curved portion of said path and engaging the back of each reflector unit as it enters a curved portion of said path, and being operative to maintain said units separated and out of abutting relationship during their engagement with said driving means, each reflector unit being disengaged from said driving means upon its entry into the said straight portion of said path and coming into direct abutting contact with the reflector unit next in advance thereof and being directly engaged by and pushed through said straight portion by the reflector next behind it, and means to drive said film in the plane of said film at an angle of 45° to the said plane of the movement of said reflector units and through said plane of said reflector units and toward the plane in which lies said lens, said reflector units moving away from said plane of said film and toward said plane of said lens and across the principal axis of said lens in said straight portion of said path.

3. In an optical apparatus provided with a continuously moving film, the combination of a continuously open lens, a series of unconnected reflector units, each comprising two reflecting surfaces stationary with respect to each other and disposed relatively vertically one over the other and each disposed at an angle of 45° to a plane coincident with the principal axis of the lens normal to the plane of the film, one of said reflecting surfaces making an angle of 45° with a plane normal to the axis of the lens and the other of said reflecting surfaces making an angle of 45° to the plane of the film, means to continuously move said units through the field of illumination of said lens in a straight path parallel to a plane coincident with the axis of the lens and normal to the plane of said film with the centers of the upper reflectors in said plane of said principal axis of said lens and the direction of the motion being away from said plane of said film in a plane making angles of 45° with the plane of said film and the axis of said lens, the centers of the lower series of reflectors lying in a plane normal to the plane of the film and parallel to the axis of the film, the median line of the film passing through the said plane in which lie the centers of the lower reflector surfaces and in a direction of 45° to said plane, the speed of said film in a plane coincident with the axis of said lens and normal to the plane of said film and toward the plane of said lens being the same as that of said reflectors, in a plane coincident with said axis and parallel to that of the film, each reflector unit being pushed through said straight path by the reflector unit next behind it, and with which it is in direct contact.

4. In a projector arranged to cooperate with a film having a series of pictures disposed thereon corner to corner with the diagonals forming a right line coincident with the median line of said film, each picture being taken through a color screen of a color different from that of the adjacent picture, the vertical dimension of each picture being disposed at an angle of 45° to the median line of said film, the combination with a lens of a film trap or gate having a rhomboidal opening therethrough with the center of said opening on the said median line of said film, the smaller angles of said opening being 45°, the longer sides of said opening being twice the width of a picture and the shorter sides being equal in length of a diagonal of a picture, said film in said trap being in a plane parallel to the axis of said lens and the direction of the travel of the film through said trap being at an angle of 45° to a plane normal to the principal axis of said lens, a series of reflector units, driving means to move said units through the field of illumination of said lens in a plane paralled to the axis of said lens and normal to the plane of said film in said trap, each reflector comprising two reflecting surfaces one directly over the other and both disposed at angles of 45° to a plane coincident with the principal axis of the lens and normal to the plane of the film, the plane of the centers of the upper reflectors being in said plane coincident with the axis of the lens and normal to the plane of said film and the plane of the centers of the lower set of reflectors being normal to the plane of said film and parallel to the axis of said lens and through the center of said opening, said driving means being operative to move said series of reflectors and said film at the same linear speed, the film through said plane coincident with the principal axis of the lens and downwardly toward the plane in which lies said lens and said series of reflectors away from the plane of said film at an angle of 45° with the plane of said film and towards the plane of said lens, and means to pre-color the light transmitted to each picture on said film in its passage across said opening in said film-trap, with a color corresponding to that of the color screen through which said pictures were made and comprising a disc having a series of openings therethrough separated by radial webs, means to rotate said disc and to hold a web of said disc stationary with respect to said film and in registration with the contiguous corners of successive pictures as they traverse said opening in said film-trap.

5. In an optical apparatus operative with a continuously moving film, the combination with a continuously open lens of a series of like, independent, unconnected, double-reflector units, a pair of spaced supports therefor and between which said series of units is mounted, said supports providing a closed cam path in which said units are adapted to slide, said cam path having a straight portion passing transversely through the field of illumination of said lens, a sprocket wheel within, and to rotate on an axis slightly eccentric to a curved portion of said cam path, and means to continuously rotate said sprocket wheel, said units being arranged to be engaged by said sprocket wheel and maintained out of contact with each other as said units traverse that portion of said cam path adjacent said wheel, whereby each unit is consecutively driven by said wheel while said unit passes around the same and whereby each unit after leaving said sprocket wheel is pushed through said straight portion of said cam path by the reflector unit next behind it and with which said reflector unit so pushed is in direct physical contact.

6. In an optical apparatus operative in conjunction with a continuously moving film, the combination with a continuously open lens of a series of like, independent, unconnected, double-reflector units, a pair of spaced supports therefor and between which said series of units is mounted, said supports providing a closed cam path in which said units are adapted to slide, said cam path having a straight portion passing transversely through the field of illumination of said lens, a sprocket wheel within the boundaries of said cam path, and means to continuously rotate the same, said units being engaged by said sprocket wheel and impelled thereby as said units traverse said portion of said cam path adjacent said sprocket wheel and out of contact with each other, each unit, after leaving said sprocket wheel, being impelled through said cam path by the reflector unit next behind it and with which said reflector unit, so impelled, is in direct physical contact, the linear speeds and the directions of the travel of said film, and of said series of reflectors through the field of illumination of said lens, being such as to maintain a fixed focal distance through the reflector units from the plane of said film to the optical center of said lens.

7. In an optical apparatus operative in conjunction with a continuously moving film, the combination with a continuously open lens of a series of like, independent, unconnected reflector units, means providing a closed cam path in which said units slide, said cam path having a straight portion extending across the field of illumination of said lens at an angle of 45° to the axis of said lens and disposed in a relatively horizontal plane parallel to the axis of said lens and normal to the plane of the film, a drive wheel mounted in a curved portion of said cam path, on an axis slightly eccentric to the curvature of said cam path, means to continuously rotate the same, means carried by said units arranged to be engaged by said wheel as said units travel that portion of said path extending around said wheel, whereby each unit is consecutively driven by said wheel, each unit after it leaves said wheel being impelled through said straight portion of said cam path by the reflector unit next behind it in the series and with which said reflector unit, so impelled, is in direct physical engagement, the direction of the movement of said film being at an angle of 45° to and through the plane of the travel of said reflectors, the linear speed of said film being the same as that of said series of reflectors.

8. In a projector arranged to project complemental parts of two consecutive pictures on a continuously moving film to a screen in natural colors, a casing, a projector lens in the front side thereof, an opening through a side of said casing for the admission of light, a film-trap having an opening therethrough in alinement with said opening in said casing, means to continuously move said film through said trap across said opening therein, a series of reflector units maintained in a fixed optical relationship with respect to said film, means to move the same at the same linear speed as that of the film and means between said film-trap and the opening in said casing to pre-color the light projected against said film to impart to each picture on the film a color corresponding with that through which the exposure for the picture was made, and comprising a circular series of color screens corresponding to the series of color screens through which the successive pictures were taken, and means to rotate the said series of screens on an axis normal to said film, consecutively through the beam of projected light between said opening and said film-trap, at a speed synchronized to that of the film to maintain the line between two adjacent color screens in substantial registration with the point where the corners of two successive pictures on the film substantially abut throughout the travel of said picture across said opening in said film-trap.

9. In a projector for projecting complemental portions of two consecutive pictures on a film to form one complete picture on the screen in natural colors, said pictures being arranged on said film with a diagonal thereof in substantial alinement with the median line of the film, the combination of a casing, a projector lens in the front side thereof, an opening through a wall of said casing for the admission of light, a film-trap having an opening therethrough in alinement with said opening in said casing, means to continuously move said film through said trap across said opening therein, a series of reflector units in a fixed optical relationship with respect to said film and each other, means to move said units at the same linear speed as that of the film, and means to pre-color the light projected against said film to illumine each picture with a color corresponding with that through which the exposure of the picture was made and comprising a circular series of color screens corresponding to the series of color screens through which the pictures were taken, and means to rotate the said series to move the same consecutively through the beam of projected light between the source of light and said film-trap, and maintain a color screen in substantial registration with a single picture on the film, throughout the travel of said picture across said opening in said film-trap and the succeeding and following color screen in registration with the next succeeding picture on the film throughout the travel of said next picture across said opening in said film-trap, the line between adjacent color screens on said disc being maintained stationary with respect to the film and in registration with the abutting corners of adjacent pictures throughout their travel across said opening.

10. In an optical apparatus arranged to cooperate with a film having a series of pictures substantially touching, with a radial diagonal of each picture arranged substantially coincident with the median line of the film, the combination of a continuously open lens, a continuously moving series of reflectors moving in a right line path through the field of illumination of the lens, away from the plane of said film and towards the plane of the lens, making angles of 45° with the plane of the film and with the principal axis of the lens respectively, the film moving through the plane of the movement of the reflectors relatively downwardly at an angle of 45° thereto and toward said plane of said lens, whereby a fixed distance is maintained between the film and the optical center of the lens through the reflector, each reflector comprising two reflector surfaces fixed with respect to each other, one over the other, said reflecting surfaces being disposed at angles of 45° to a plane coincident with the axis of the lens and normal to the plane of the film, the light received by one of said reflecting surfaces being reflected vertically to the other reflector and thence being reflected outwardly by the second reflector surface, the light entering and leaving said unit in parallel planes and the direction of the light leaving said unit being parallel to a plane normal to the direction of the light entering said unit, and means to pre-color the light delivered to said film differently for consecutive pictures on said film, said means comprising a circular series of colored screens, means to rotate said series consecutively through the beam of projected light between the source of light and the film-trap and to maintain the dividing line between adjacent colored screens substantially stationary with respect to the film and in registration with abutting corners of successive pictures on the film throughout their travel through said pre-colored light whereby the picture projected upon the screen is composed of two constantly varying complemental parts of two successive pictures moving through said beam of pre-colored light, said complemental parts being differently colored.

11. A projector for projecting moving pictures in natural colors from a film having thereon a series of pictures originally made through a set of different color filters, the combination of a lens, a film-trap having an opening therethrough with the center thereof in optical alinement with the axis of the lens, a roller to draw said film through said trap and across said opening, a color mechanism for imparting to each exposure during its projection, the color corresponding to that of the filter through which it was made and comprising a plate having a circular series of windows therethrough separated by a narrow web and a plurality of sets of color screens in said windows arranged in the same order of colors as that of said set of color filters which were used in making the pictures, said plate being rotatable on an axis normal to the plane of the film as it passes through said film box, the periphery of said feed rollers being a multiple of the "spacing" of the pictures on the film and divisible by the number of colors in said set of colors so that a complete number of pictures divisible by the number of colors in said set traverse said opening in said trap during every revolution of said roller, gearing connecting said feed roller and said color plate to maintain a fixed ratio between the angular speed of said plate and the angular speed of said roller, the ratio of angular speed of said plate to the angular speed of the roller being the ratio which the number of pictures which pass over said opening in every revolution of said roller bears to the number of windows in said plate.

12. In a projector for projecting pictures to a screen in natural colors from a film, each exposure of which was made through one of a series of complementary color filters, the pictures being arranged on the film with a diagonal of each picture coincident with the median line of the film, the combination of a casing, a projector lens in the front thereof, an opening through a wall of said casing for the admission of projector light, a film trap having a rhomboidal opening therethrough in alinement with said opening in said casing, whereby two complemental parts of two consecutive pictures on the film are substantially continually illuminated, means to continuously move said film through said trap, a continuous series of continuously moving double reflector units operative to maintain a fixed constant relationship and distance between the optical center of said lens and said film and to maintain the reflected image of each complemental part of two succesive pictures traversing the opening in said film trap in a fixed position on the screen and a disk having a circular series of segmental openings therethrough separated by a narrow radial web, each opening being provided with a color screen, the series of color screens in said disk corresponding to the series of filters through which the pictures on the film were made, the plane of the disk being optically parallel to the plane of the film, means to continuously rotate said disk at a speed synchronized to that of the film to maintain successive screens respectively in registration with successive pictures on the film throughout the travel of said pictures across the opening in said film trap and to maintain said webs substantially stationary with respect to the film and in registration with the corners of successive pictures during their travel across said opening in said film trap, whereby the light projected against each exposure on the film is pre-colored with the color corresponding to that of the filter through which the exposure of the picture was made.

13. In a projector for projecting pictures to a screen in natural colors from a film on which the pictures are arranged in a series, with a diagonal of each picture in alinement with the median line of the film, each picture having been made through one of a series of complementary color filters, the combination of a casing, a projector lens in a wall thereof, an opening through a wall of said casing for the admission of projector light, a film trap having an opening therethrough in alinement with said opening in said casing, whereby the complemental portions of two consecutive pictures on said film are substantially always exposed in said opening and are illuminated, means to move said film continuously through said trap, a continuous series of double reflector units operative to maintain a fixed constant relationship and distance between the optical center of said lens and said film, and to maintain the reflected image of each complemental part of the two successive pictures traversing the opening in said film trap in a fixed position on said screen, a disk having a series of segmental openings therethrough separated by a narrow radial web, each opening being provided with a color screen, the series of color screens in said disk corresponding to the series of filters through which the pictures on the film were made, the plane of said disk being parallel to the plane of said film, means to continuously rotate said disk at a speed synchronized to that of the film to maintain the successive color screens in respective registration with successive pictures on the film throughout their travel through said opening in said film trap and to maintain said webs substantially stationary with respect to said film and in registration with the abutting corners of adjacent pictures, and means to adjust said film in said trap to aline a picture with a color screen of the proper color therefor and with respect to a reflector unit, whereby the light projected against each exposure on the film is precolored with the color corresponding with that of the filter through which the exposure of the picture was originally made.

14. In an optical apparatus arranged to operate with a continuously moving film having a series of pictures arranged thereon with the diagonal of each picture in substantial alinement with the median line of said film, the combination of a continuously open lens, a continuously moving series of reflector units disposed in a relatively horizontal plane and moving in a right line both through the field of illumination of said lens toward the plane of said lens and making an angle of 45° with the plane of the film and with the principal axis of the lens respectively, the film moving downwardly in a relatively vertical plane normal to the plane of the movement of the reflector units, normal to the plane of the lens at an angle of 45° to the plane of the movement of said reflector units and at an angle of 45° to the plane in which lies said lens, whereby a fixed distance is maintained between the film and the optical center of the lens through said unit, each reflector unit comprising two reflecting surfaces fixed with respect to each other, one over the other, said reflecting surfaces being disposed at angles of 45° to a relatively horizontal plane, the light projected to the first reflecting surface through said film being reflected vertically to the second reflecting surface and by said second reflecting surface outwardly in a relatively horizontal plane in a direction at right angles to the direction of the light projected to said first reflecting surface and through the lens, and means to precolor the light delivered to each picture as it passes through the field of illumination of the lens, comprising a circular series of color screens, means to rotate the same consecutively through the beam of light projected to said film and to maintain the radially disposed dividing lines between two adjacent color screens stationary with respect to the film while passing through said field of illumination of said lens and in registration with the adjacent corners of successive pictures on said film respectively, the axis upon which said circular series of color screens rotates being normal to the plane of the film.

15. In an optical apparatus for making and projecting moving pictures in natural colors in combination of a casing, a lens in said casing, a film trap having an opening therethrough in optical alinement with the axis of said lens, means to continuously move a film through said trap across said opening therein, a series of reflector units between said film and said lens maintained in a fixed optical relationship with respect to said film, and means to move said units at the same linear speed as that of said film, a circular series of color screens and means to continuously rotate said screens in a circular path, consecutively through the beam of light transmitted between said film and said lens at a speed synchronized to that of said film and reflectors to maintain each screen respectively in registration with a picture area of said film throughout the travel of said area across said opening in said film trap.

16. In an optical apparatus for making and projecting motion pictures in natural colors, the combination of a casing, a lens mounted therein, a film trap having an opening therethrough in alinement with said opening in said casing, a film, means to continuously move said film through said trap across said opening therein, a series of reflector units in fixed optical relationship with respect to said film and said lens, means to move said units at the same linear speed as that of said film, a circular series of color screens, and means to rotate the same consecutively through the beam of light transmitted between said film and said lens and to maintain a color screen respectively in substantial registration with a single picture area on said film throughout the travel of said area across said opening in said trap and the succeeding and following color screens in registration respectively with the following picture areas on said film throughout the travel of said areas across said opening in said film trap, the line between adjacent color screens in said disk being maintained substantially stationary with respect to the film and maintained between adjacent picture areas throughout the travel of said areas across said opening.

17. In an optical apparatus for making and projecting motion pictures in natural colors, a film, each exposure of which is made through one of the series of color filters with exposed areas arranged on the film with the diagonal of the exposure coincident with the median line of the film, of a casing, a lens in the front thereof, a film trap having a rhomboidal opening therethrough and means to continuously draw a film across said opening whereby two complemental parts of two consecutive picture areas on the film are substantially continually in said opening, a series of continuously moving reflector units operative to maintain a fixed constant relationship and distance between the optical center of said lens and said film and a disk having a circular series of openings therethrough separated by narrow radial webs, each opening being provided with a color screen, the plane of the disk being optically parallel to the plane of the film, means to continuously rotate said disk at a speed synchronized with that of the film to maintain successive screens respectively in registration with successive picture areas on the film throughout the travel of the areas across the opening in said film trap and to maintain said webs substantially stationary with respect to the film and between the successive picture areas during their travel across said opening whereby the light traveling between said film and said lens may be properly colored for the production of motion pictures and whereby the light to and from any given picture area on said film passes through a single color screen only throughout the travel of said area across said opening in said trap.

18. In an optical apparatus for making and projecting motion pictures in natural colors, the combination of a film, a film trap having an opening therethrough, means to continuously move said film through said trap and across said opening, the opening being of a size whereby the complemental variations of two consecutive picture areas on said film are substantially always exposed in said opening, a continuous series of reflector units operative to maintain a fixed constant relationship and distance between the optical center of said lens and the plane of said film, a disk having a series of segmental openings therethrough separated by narrow webs respectively, each opening being provided with a color screen, the plane of said disk being optically parallel to the plane of said film, means to continuously rotate said disk at a speed synchronized to that of said film to maintain successive color screens in respective registration with successive picture areas on said film throughout their travel of said opening in said film trap to maintain said web substantially stationary with respect to said film and in registration with the adjacent portions of successive picture areas and means to adjust said film on said trap to aline a picture area with a color screen of the proper color therefor, whereby the light traveling between each picture area on said film and said lens is colored with a color corresponding to that of the filter in registration with that picture area.

EDMOND H. LYSLE.